US010069404B2

(12) United States Patent
Takata

(10) Patent No.: US 10,069,404 B2
(45) Date of Patent: *Sep. 4, 2018

(54) PFC SIGNAL GENERATION CIRCUIT, PFC CONTROL SYSTEM USING THE SAME, AND PFC CONTROL METHOD

(71) Applicant: Renesas Electronics Corporation, Tokyo (JP)

(72) Inventor: Yasuhiro Takata, Kanagawa (JP)

(73) Assignee: Renesas Electronics Corporation, Koutou-ku, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/434,674

(22) Filed: Feb. 16, 2017

(65) Prior Publication Data

US 2017/0163149 A1  Jun. 8, 2017

Related U.S. Application Data

(63) Continuation of application No. 14/113,612, filed as application No. PCT/JP2012/002341 on Apr. 4, 2012, now Pat. No. 9,614,432.

(30) Foreign Application Priority Data

Apr. 26, 2011 (JP) ................. 2011-098789

(51) Int. Cl.
*H02M 1/42* (2007.01)
*H05B 33/08* (2006.01)
(Continued)

(52) U.S. Cl.
CPC .......... *H02M 1/4225* (2013.01); *H02M 1/42* (2013.01); *H02M 3/1584* (2013.01);
(Continued)

(58) Field of Classification Search
CPC ... H02M 2001/007; H02M 2001/0058; H02M 1/083; H02M 1/14; H02M 1/15;
(Continued)

(56) References Cited

U.S. PATENT DOCUMENTS 5,801,935 A   9/1998  Sugden et al.
6,370,045 B1  4/2002  Lurkens
(Continued)

FOREIGN PATENT DOCUMENTS

CN    101313632 A    11/2008
CN    101728953 A     6/2010
(Continued)

OTHER PUBLICATIONS

Communication dated Jul. 7, 2015 from the State Intellectual Property Office of the People's Republic of China issued in corresponding Chinese application No. 201280020371.5.
(Continued)

*Primary Examiner* — Fred E Finch, III
(74) *Attorney, Agent, or Firm* — Sughrue Mion, PLLC

(57) ABSTRACT

A PFC signal generation circuit which generates a PFC signal to control a PFC circuit including a first inductor connected to a first switch and a second inductor connected to a second switch includes: a first control signal output circuit that outputs a first PFC signal to turn on the first switch at a zero current detection timing of the first inductor; a timing adjustment circuit that generates a control signal to turn on the second switch after waiting until a target timing, when a zero current detection timing of the second inductor is earlier than the target timing, and to turn on the second switch at a target timing in a subsequent cycle, when it is later than an allowable period from the target timing; and a second control signal output circuit that generates a second PFC signal to turn on the second switch according to a control signal.

10 Claims, 22 Drawing Sheets

(51) Int. Cl.
*H02M 3/158* (2006.01)
*H02M 1/00* (2006.01)

(52) U.S. Cl.
CPC ... *H05B 33/0815* (2013.01); *H02M 2001/007* (2013.01); *H02M 2001/0009* (2013.01); *H02M 2003/1586* (2013.01)

(58) Field of Classification Search
CPC .... H02M 1/42; H02M 1/4208; H02M 1/4225; H02M 1/4258; H02M 3/156; H02M 3/157; H02M 3/1584; H02M 2003/1586; H05B 33/0815
See application file for complete search history.

(56) References Cited

U.S. PATENT DOCUMENTS

| | | | |
|---|---|---|---|
| 9,614,432 B2 * | 4/2017 | Takata | ................ H02M 1/4225 |
| 2003/0172103 A1 | 9/2003 | Feldtkeller | |
| 2009/0295347 A1 | 12/2009 | Popescu et al. | |
| 2010/0040877 A1 | 2/2010 | Yoshida et al. | |
| 2010/0097041 A1 | 4/2010 | Ayukawa et al. | |
| 2010/0097828 A1 | 4/2010 | Chen | |
| 2010/0226149 A1 | 9/2010 | Masumoto | |
| 2011/0001362 A1 | 1/2011 | de Groot et al. | |
| 2012/0187929 A1 | 7/2012 | Ohshita et al. | |

FOREIGN PATENT DOCUMENTS

| | | |
|---|---|---|
| JP | 1-293449 A | 11/1989 |
| JP | 2007-195282 A | 8/2007 |
| JP | 2010-119285 A | 5/2010 |
| JP | 2010-200437 A | 9/2010 |
| JP | 2010-233439 A | 10/2010 |
| WO | 2008/032769 A1 | 3/2008 |

OTHER PUBLICATIONS

International Search Report for PCT/JP2012/002341 dated Jun. 26, 2012.

* cited by examiner

1

PFC SIGNAL GENERATION CIRCUIT, PFC CONTROL SYSTEM USING THE SAME, AND PFC CONTROL METHOD

CROSS REFERENCE TO RELATED APPLICATIONS

This application is a continuation application of U.S. application Ser. No. 14/113,612, filed Oct. 24, 2013, which is a National Stage of International Application No. PCT/JP2012/002341 filed Apr. 4, 2012, claiming priority based on Japanese Patent Application No. 2011-098789 filed Apr. 26, 2011, the contents of all of which are incorporated herein by reference in their entirety.

TECHNICAL FIELD

The present invention relates to a PFC signal generation circuit, a PFC control system using the same, and a PFC control method.

BACKGROUND ART

With the recent demand for miniaturization, low power consumption, and the like of electronic devices, power supplies incorporating a switching circuit that repeats turning on and off periodically, which are so-called switching power supplies, have been more frequently used. The use of PWM (Pulse Width Modulation) control for adjusting a duty ratio of an input pulse signal, for example, in each switching power supply enables adjustment of an output voltage according to an operating state of an electronic device.

In addition, there is an increasing demand for a further reduction in power consumption by improving the conversion efficiency. In the International Energy Star Program (Energy Star), for example, a power factor correction (PFC) is necessary for electronic devices of 75 W or higher. The PFC control includes a single mode and an interleave mode. In the interleave mode, switching operations are complementarily performed by two PFC control pulse signals having a phase difference π (180°). As a result, two coil currents having a phase difference π are generated. Accordingly, in the interleave mode, electric power twice as large as that in the single mode is obtained. Further, the ripple of an output current is small, which leads to a reduction in the capacity of a capacitor for reducing the ripple.

Patent Literature 1 discloses a switching power supply which employs a critical mode interleaved PFC control. Patent Literature 1 discloses a technique for detecting only a zero current in one coil current and automatically generating PFC control pulse signals having a phase difference n, and a technique for detecting a zero current in each of two coil currents and generating two PFC control pulse signals. In the latter case, the critical mode for both coil currents can be ensured, which results in improvement in efficiency.

Note that Patent Literature 2 discloses a watchdog timer which detects an input of a clear signal within a certain period of time to be counted, in accordance with execution of a program, and outputs a reset signal to a computer to inform an abnormality. This watchdog timer includes signal control means that allows the clear signal to be input only before a set time with respect to an end time of the certain period of time.

CITATION LIST

Patent Literature

[Patent Literature 1] International Patent Publication No. WO 2008/032769
[Patent Literature 2] Japanese Unexamined Patent Application Publication No. 01-293449

SUMMARY OF INVENTION

Technical Problem

The present inventor has found the following problems.

In the case of detecting a zero current in each of the two coil currents in Patent Literature 1, there is a possibility that the phase difference between the two PFC control pulse signals, which should be about n, becomes extremely small or large due to noise or the like. There is also a possibility that such abnormal PFC control pulse signals cause an increase in power loss and a reduction in power factor.

Solution to Problem

A PFC signal generation circuit according to the present invention is a PFC signal generation circuit that generates a PFC signal to control a PFC circuit including a first inductor connected to a first switch and a second inductor connected to a second switch. The PFC signal generation circuit includes: a first control signal output circuit that outputs a first PFC signal to turn on the first switch at a zero current detection timing of the first inductor; a timing adjustment circuit that generates a control signal to turn on the second switch after waiting until a target timing, when a zero current detection timing of the second inductor is earlier than the target timing, and to turn on the second switch at a target timing in a subsequent cycle, when the zero current detection timing of the second inductor is later than an allowable period from the target timing; and a second control signal output circuit that generates a second PFC signal to turn on the second switch, according to the control signal.

A PFC control system according to the present invention is a PFC control system including: a PFC circuit connected to an AC power supply; and a PFC signal generation circuit that generates a PFC signal to control the PFC circuit. The PFC circuit includes: a first inductor connected to a first switch; and a second inductor connected to a second switch. The PFC signal generation circuit includes: a first control signal output circuit that outputs a first PFC signal to turn on the first switch at a zero current detection timing of the first inductor; a timing adjustment circuit that generates a control signal to turn on the second switch after waiting until a target timing, when a zero current detection timing of the second inductor is earlier than the target timing, and to turn on the second switch at a target timing in a subsequent cycle, when the zero current detection timing of the second inductor is later than an allowable period from the target timing; and a second control signal output circuit that generates a second PFC signal to turn on the second switch, according to the control signal.

A PFC control method according to the present invention is a PFC control method that controls a PFC circuit including a first inductor connected to a first switch and a second inductor connected to a second switch. The PFC control method includes: turning on the first switch at a zero current detection timing of the first inductor; turning on the second switch after waiting until a target timing, when a zero current detection timing of the second inductor is earlier than the target timing; and turning on the second switch at a target timing in a subsequent cycle, when the zero current detection timing of the second inductor is later than an allowable period from the target timing.

According to the present invention, when a second timing at which a zero current of the second inductor is detected is earlier than a target timing, the second switch is turned on at the target timing; when the second timing is within an allowable period from the target timing, the second switch is turned on at the second timing; and when the second timing is later than the allowable period, the second switch is turned on at a target timing in a subsequent cycle. This makes it possible to further improve the power factor correction by the PFC circuit.

Advantageous Effects of Invention

According to the present invention, it is possible to generate a PFC control pulse signal that further improves the power factor correction by a PFC circuit.

DESCRIPTION OF EMBODIMENTS

Hereinafter, specific embodiments of the present invention will be described in detail with reference to the drawings. However, the present invention is not limited to the following embodiments. For clarity of explanation, the following description and the drawings are simplified as needed.

First Embodiment

First, the outline of a processor system to which a PFC signal generation unit according to this embodiment is applied will be described. The PFC signal generation unit according to this embodiment is applied to the processor system described below. However, the processor system described below is illustrated by way of example, and the present invention is also applicable to other processor systems.

Figure 1:
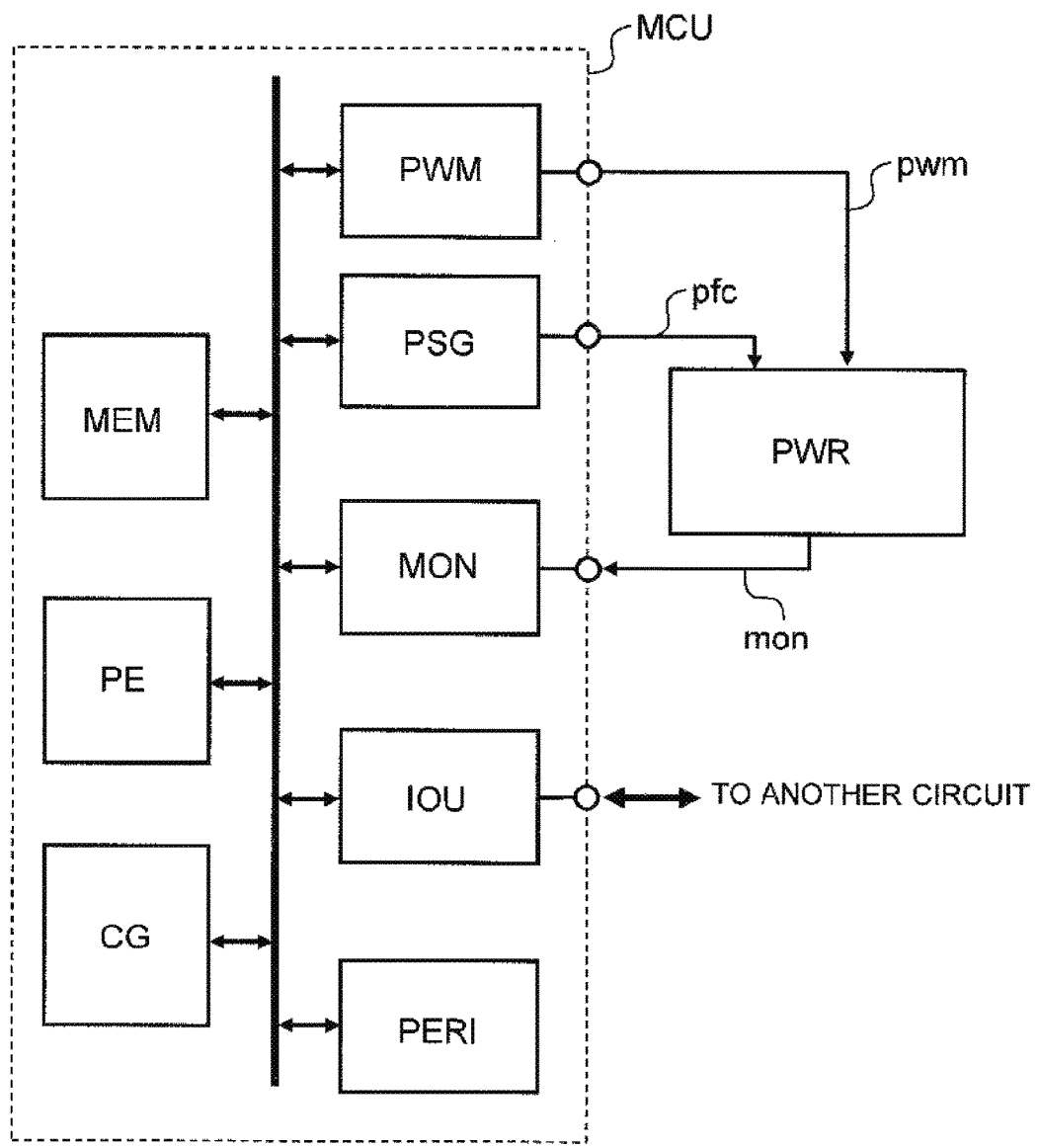
FIG. 1 is a schematic diagram of a processor system MCU to which a PWM signal generation unit according to an embodiment is applied.

FIG. 1 is a schematic diagram of a processor system MCU to which a PWM signal generation unit according to this embodiment is applied. As shown in FIG. 1, this processor system MCU includes a memory MEM, an operation core PE, a clock generation unit CG, a PWM signal generation unit PWM, a PFC signal generation unit PSG, a monitor unit MON, an IO unit IOU, and a peripheral circuit PERI.

FIG. 1 also shows a control target circuit PWR which is controlled by the processor system MCU. This control target circuit PWR is a power supply circuit, for example. This power supply circuit generates a DC power supply voltage with high efficiency from an AC power supply voltage based on a PFC control pulse signal pfc generated by the PFC signal generation unit PSG (AC/DC conversion). Further, based on a PWM control pulse signal pwm generated by the PWM signal generation unit PWM, a DC power supply voltage is generated by boosting or stepping down the DC power supply voltage (DC/DC conversion), and is supplied to another circuit.

The memory MEM stores programs used by the processor system MCU, and set values used to cause the processor system MCU to operate, for example.

The operation core PE performs specific processes required for the processor system MCU, based on a program stored in the memory MEM, or an externally loaded program. The operation core is generally a CPU (Central Processing Unit).

The clock generation unit CG generates clock signals for use in each circuit block within the processor system MCU. The clock signals generated by the clock generation unit CG may be output to the outside.

Note that the clock signals for use in the processor system MCU can also be supplied from an external circuit.

The PWM signal generation unit PWM generates the PWM control pulse signal pwm which is a pulse signal for PWM control of the control target circuit PWR. This PWM signal generation unit PWM can be achieved by using a timer function of the processor system MCU, for example.

The PFC signal generation unit PSG generates the PFC control pulse signal pfc which is a pulse signal for use in PFC control for the control target circuit PWR. As with the PWM signal generation unit PWM, the PFC signal generation unit PSG can be achieved by using the timer function of the processor system MCU, for example.

The monitor unit MON monitors a feedback signal mon which is sent from the control target circuit PWR to generate the PWM control pulse signal pwm and the PFC control pulse signal pfc. The monitor unit MON converts the feedback signal mon, which is an analog signal, into a digital signal, and transmits the digital signal to the operation core PE, for example. In the example of FIG. 1, the feedback signal mon output from the control target circuit PWM, which is externally provided, is monitored, and the digital value corresponding to the feedback signal mon is loaded into the processor system MCU. This monitor unit MON can be composed of a circuit capable of converting an analog value into a digital value, such as an analog-to-digital converter (ADC) or a comparator circuit.

The IO unit IOU communicates with an externally-provided circuit, and receives a control signal or the like for the processor system MCU, or transmits processing results of the processor system MCU, for example. Specific examples of the IO unit IOU may include an SPI unit and a UART unit. Note that the SPI unit performs communication based on SPI (System Packet Interface) specifications, which is 3-wire or 4-wire serial communication. The UART (Universal Asynchronous Receiver Transmitter) unit converts serial signals of an asynchronous communication system into parallel signals, and also performs the conversion in the opposite direction.

The peripheral circuit PERI is a circuit other than the circuit blocks described above, and includes a circuit block used by the operation core PE. Examples of the peripheral circuit PERI may include a timer unit, a watchdog timer unit, a DMA (Direct Memory Access) unit, a low-voltage detection unit, and a power-on reset (POR) unit.

The processor system MCU to which the present invention is applied has a configuration in which the operation core PE, the memory MEM, the PWM signal generation unit PWM, the PFC signal generation unit PSG, the monitor unit MON, the IO unit IOU, and the peripheral circuit PERI are interconnected via a bus. Although not shown, the processor system MCU is supplied with power from another circuit.

The processor system MCU described above is an example of the processor system to which the present invention is applied, and the programs and data stored in the memory MEM can be modified as needed depending on the specifications of the system, for example. For example, the circuit blocks may be connected via a plurality of buses, or the operation core PE may be directly connected to the other circuit blocks without involving a bus.

The processor system MCU generates the PWM control pulse signal pwm and the PFC control pulse signal pfc, and supplies them to the control target circuit PWR. The processor system MCU controls the duty of the PWM control pulse signal pwm and the PFC control pulse signal pfc, the generation timing of the PWM control pulse signal pwm, and the like based on the feedback signal mon from the control target circuit PWR, the control signal received from another circuit, and the like.

To specify the utilization form of each of the PWM control pulse signal pwm and the PFC control pulse signal pfc, which are generated by the processor system MCU, a power supply circuit will be described as an example of the control target circuit PWR. The power supply circuit described below drives an LED (Light Emitting Diode) as a load circuit. However, the load circuit is not limited to an LED, but may also be a general circuit.

Figure 2A:
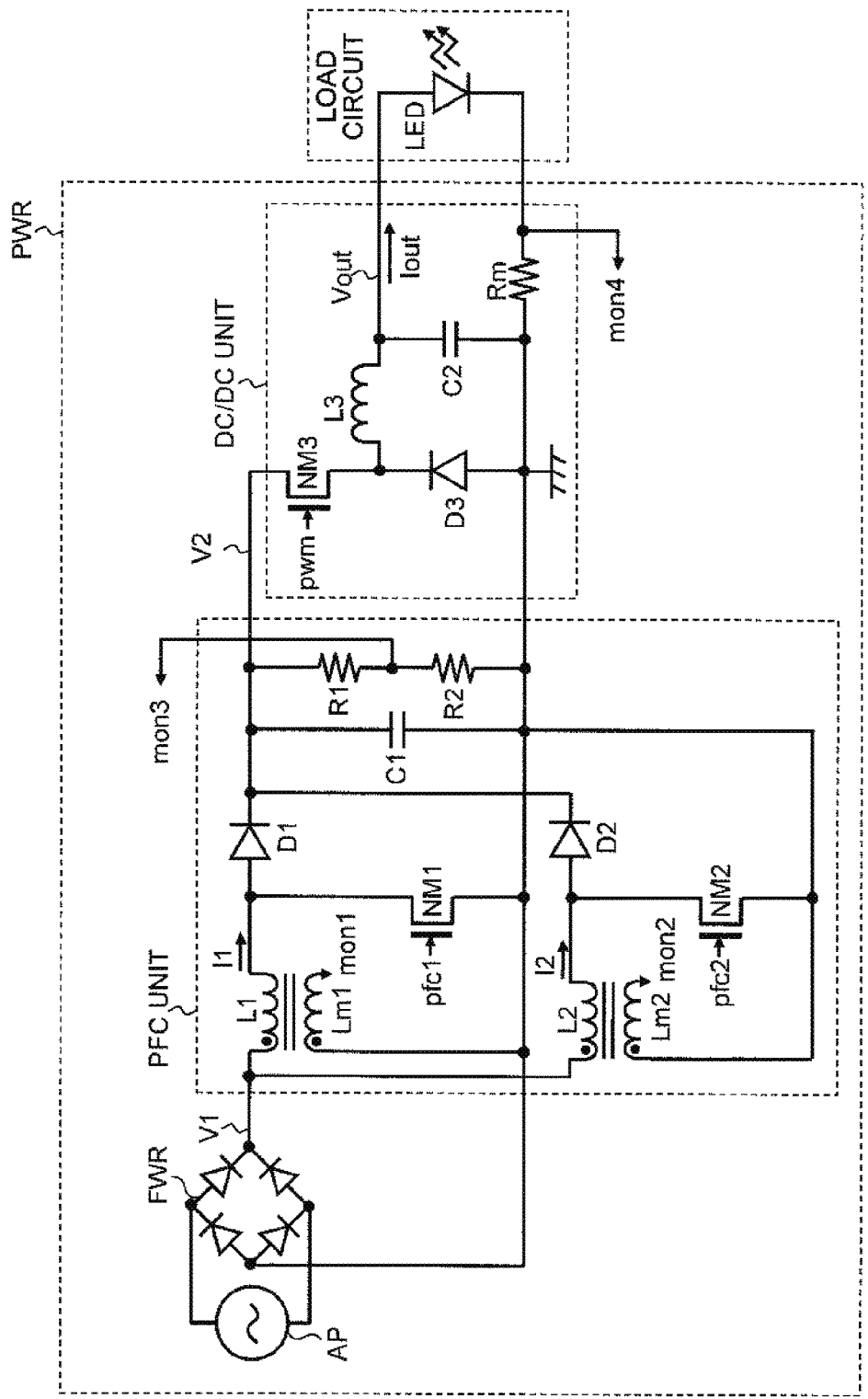
FIG. 2A is a circuit diagram of a power supply circuit that drives an LED.
Figure 2B:
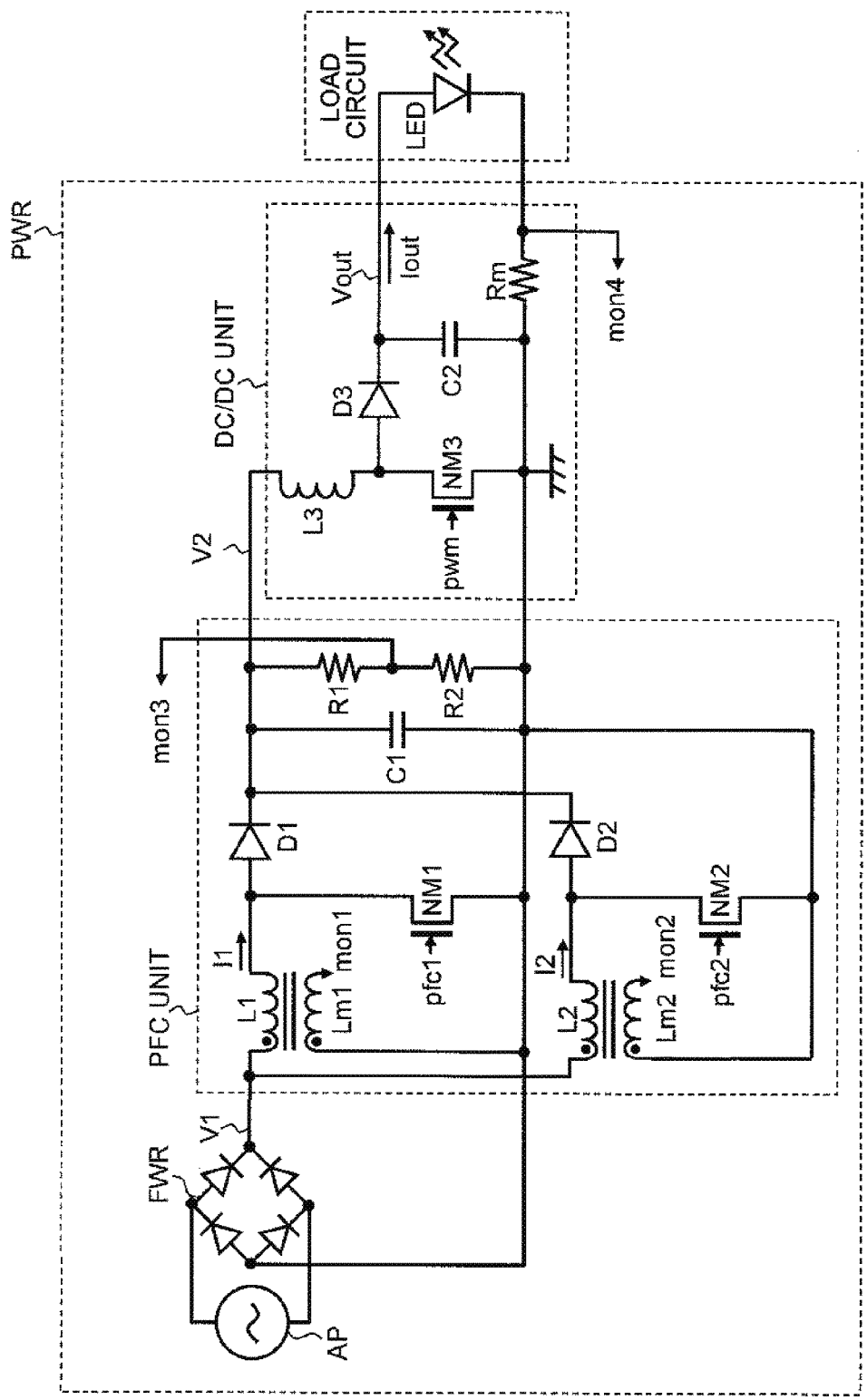
FIG. 2B is a circuit diagram of the power supply circuit that drives the LED.

FIGS. 2A and 2B each show an example of the power supply circuit that drives an LED. In FIGS. 2A and 2B, the power supply circuit is denoted by PWR. In the power supply circuit PWR shown in FIGS. 2A and 2B, an NMOS transistor is used as an output transistor that performs a switching operation. This output transistor may be composed of a PMOS transistor, a PNP transistor, or an NPN transistor.

Each of the power supply circuits PWR shown in FIGS. 2A and 2B includes an AC power supply AP, a full-wave rectification circuit FWR, a PFC unit, and a DC/DC unit. In FIGS. 2A and 2B, the AC power supply AP, the full-wave rectification circuit FWR, and the PFC unit are common.

First, the full-wave rectification circuit FWR generates a DC voltage V1 from the AC power supply AP. The full-wave rectification circuit FWR is a bridge circuit including four diodes. In the full-wave rectification circuit FWR, the cathodes of two diodes each having an anode connected to the AC power supply AP are commonly connected to an output of the full-wave rectification circuit FWR. On the other hand, the anodes of two diodes each having a cathode connected to the AC power supply AP are commonly grounded.

Next, the PFC unit will be described. The PFC unit shown in FIG. 2A is a non-isolated boost converter. This PFC unit includes inductors L1, L2, Lm1, and Lm2, diodes D1 and D2, NMOS transistors NM1 and NM2, a smoothing capacitor C1, and resistors R1 and R2. The PFC unit is a PFC circuit of an interleave mode. In the PFC unit, the NMOS transistors NM1 and NM2 complementarily perform a switching operation according to two PFC control pulse signals pfc1 and pfc2 having a phase difference of about $\pi$ (180°). The PFC unit generates a DC voltage V2 from the DC voltage V1.

One end of each of the inductors L1 and L2 is commonly connected to the output of the full-wave rectification circuit FWR, and receives the voltage V1. The other end of the inductor L1 is connected to the anode of the diode D1. The other end of the inductor L2 is connected to the anode of the diode D2. The cathodes of the diodes D1 and D2 are commonly connected to one end of the smoothing capacitor C1. That is, the inductor L1 and the diode D1 which are connected in series are connected in parallel with the inductor L2 and the diode D2 which are connected in series. The other end of the smoothing capacitor C1 is grounded.

A node between the inductor L1 and the diode D1, which are connected in series, is connected to the drain of the NMOS transistor NM1. The source of the NMOS transistor NM1 is grounded. The gate of the NMOS transistor NM1 receives the PFC control pulse signal pfc1. The NMOS transistor NM1 performs a switching operation according to the voltage level of the PFC control pulse signal pfc1. Energy is accumulated in the inductor L1 during a period in which the NMOS transistor NM1 turns on. The smoothing capacitor C1 is charged with energy, which is accumulated in the inductor L1 during a period in which the NMOS transistor NM1 turns off, through the diode D1.

A node between the inductor L2 and the diode D2, which are connected in series, is connected to the drain of the NMOS transistor NM2. The source of the NMOS transistor NM2 is grounded. The gate of the NMOS transistor NM2 receives the PFC control pulse signal pfc2. The NMOS transistor NM2 performs a switching operation according to the voltage level of the PFC control pulse signal pfc2. During a period in which the NMOS transistor NM2 turns on, energy is accumulated in the inductor L2. During a period in which the NMOS transistor NM2 turns off, the smoothing capacitor C1 is charged with the energy accumulated in the inductor L2 through the diode D2. The output voltage V2 corresponding to the electric charge charged in the smoothing capacitor C1 is output.

Here, a feedback signal mon1 corresponding to a current I1 flowing through the inductor L1 is generated by the monitor inductor Lm1 which is electromagnetically coupled with the inductor L1 through a core. Then, the feedback signal mon1 is fed back to the monitor unit MON. Similarly, a feedback signal mon2 corresponding to a current I2 flowing through the inductor L2 is generated by the monitor inductor Lm2 which is electromagnetically coupled with the inductor L2 through a core. Then, the feedback signal mon2 is fed back to the monitor unit MON. With this configuration, a zero current of each of the currents I1 and I2 is detected.

In parallel with the smoothing capacitor C1, the resistors R1 and R2 are connected in series. In other words, the output voltage V2 of the PFC unit is applied to the both ends of the resistors R1 and R2. A feedback signal mon3 is output from a node between the resistor R1 and the resistor R2. The feedback signal mon3 is a monitor voltage which is obtained by dividing the output voltage V2 according to a resistance ratio of the resistors R1 and R2. This feedback signal mon3 is fed back to the monitor unit MON of the processor system MCU. Thus, the duty ratio and pulse width of the PFC control pulse signals pfc1 and pfc2 are determined. In this manner, each of the PFC units shown in FIGS. 2A and 2B serves as a constant voltage control circuit.

Next, the DC/DC units shown in FIGS. 2A and 2B will be described in order. First, the DC/DC unit shown in FIG. 2A will be described. The DC/DC unit shown in FIG. 2A is a step-down DC/DC converter. This DC/DC unit includes an NMOS transistor NM3, an inductor L3, a diode D3, a smoothing capacitor C2, and a resistor Rm.

The drain of the NMOS transistor NM3 is connected to an output of the PFC unit, and the source of the NMOS transistor NM3 is connected to the cathode of the diode D3. The gate of the NMOS transistor NM3 receives the PWM control pulse signal pwm. Accordingly, the NMOS transistor NM3 performs a switching operation according to the voltage level of the PWM control pulse signal pwm. The anode of the diode D3 is grounded. A node between the source of the NMOS transistor NM3 and the cathode of the diode D3 is connected to one end of the inductor L3. The other end of the inductor L3 is connected to one end of the smoothing capacitor C2. The other end of the smoothing capacitor C2 is grounded.

An output voltage Vout corresponding to the electric charge accumulated in the smoothing capacitor C2 is output from a node between the smoothing capacitor C2 and the inductor L3. The electric charge accumulated in the smoothing capacitor C2 is supplied to the LED as an output current Iout. The resistor Rm is provided between the cathode of the LED and the ground. The output current Iout flowing through the LED flows through the resistor Rm. That is, a voltage corresponding to the output current Iout and the resistance value of the resistor Rm is generated at the both ends of the resistor Rm. This voltage is a monitor voltage for monitoring the output current Iout. This monitor voltage is fed back to the monitor unit MON as a feedback signal mon4. The PWM signal generation unit of the processor system MCU generates the PWM control pulse signal pwm having a duty ratio or a cycle at which the voltage level of the monitor voltage is constant. In this manner, the DC/DC unit shown in FIG. 2A serves as a constant current control circuit.

Next, the DC/DC unit shown in FIG. 2B will be described. The DC/DC unit shown in FIG. 2B is a non-isolated boost DC/DC converter. This DC/DC unit also includes the NMOS transistor NM3, the inductor L3, the diode D3, the smoothing capacitor C2, and the resistor Rm.

One end of the inductor L3 is connected to an output of the PFC unit, and the other end of the inductor L3 is connected to the drain of the NMOS transistor NM3. The source of the NMOS transistor NM3 is grounded. The gate of the NMOS transistor NM3 receives the PWM control pulse signal pwm. Accordingly, the NMOS transistor NM3 performs a switching operation according to the voltage level of the PWM control pulse signal pwm. A node between the drain of the NMOS transistor NM3 and the inductor L3 is connected to the anode of the diode D3. The cathode of the diode D3 is connected to one end of the smoothing capacitor C2. The other end of the smoothing capacitor C2 is grounded.

The output voltage Vout corresponding to the electric charge accumulated in the smoothing capacitor C2 is output from a node between the smoothing capacitor C2 and the cathode of the diode D3. The electric charge accumulated in the smoothing capacitor C2 is supplied to the LED as the output current Iout. The resistor Rm is provided between the cathode of the LED and the ground. The output current Iout flowing through the LED flows through the resistor Rm. That is, a voltage corresponding to the output current Iout and the resistance value of the resistor Rm is generated at the both ends of the resistor Rm. This voltage is a monitor voltage for monitoring the output current Iout. This monitor voltage is fed back to the monitor unit MON as the feedback signal mon4. The PWM signal generation unit of the processor system MCU generates the PWM control pulse signal pwm having a duty ratio or a cycle at which the voltage level of the monitor voltage is constant. In this manner, the DC/DC unit shown in FIG. 2B also serves as a constant current control circuit.

Figure 3A:
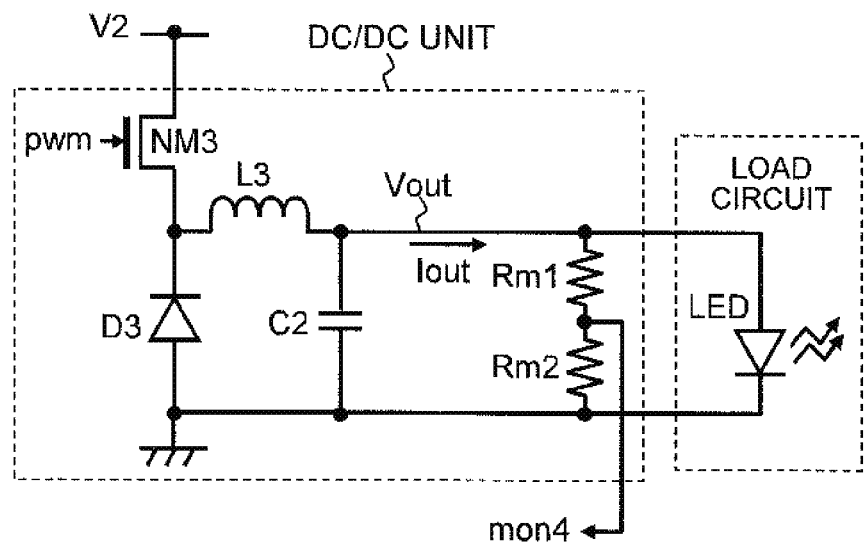
FIG. 3A is a circuit diagram showing another configuration example of a DC/DC unit.
Figure 3B:
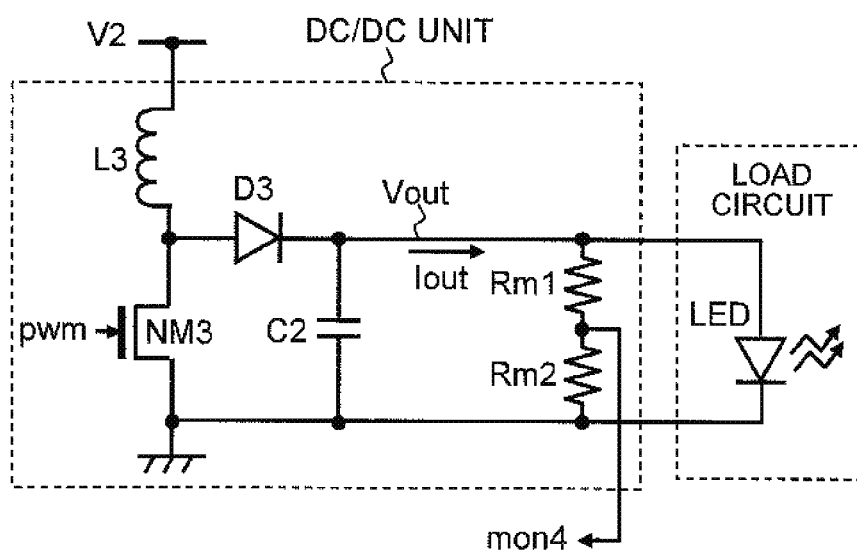
FIG. 3B is a circuit diagram showing another configuration example of the DC/DC unit.

Referring next to FIGS. 3A and 3B, other configurations of the DC/DC unit will be described. As with the DC/DC unit shown in FIG. 2A, the DC/DC unit shown in FIG. 3A is a non-isolated step-down DC/DC converter. In the DC/DC unit shown in FIG. 2A, the resistor Rm for generating the feedback signal mon4 is connected in series with the LED. On the other hand, in the DC/DC unit shown in FIG. 3A, resistors Rm1 and Rm2 for generating the feedback signal mon4 are connected in parallel with the LED.

Accordingly, the output voltage Vout of the power supply circuit PWR is applied to the both ends of the resistors Rm1 and Rm2. The feedback signal mon4 is output from a node between the resistor Rm1 and the resistor Rm2. The feedback signal mon4 is a monitor voltage which is obtained by dividing the output voltage Vout according to a resistance ratio of the resistors Rm1 and Rm2. This feedback signal mon4 is fed back to the monitor unit MON of the processor system MCU. The PWM signal generation unit of the processor system MCU generates the PWM control pulse signal pwm having a duty ratio or a cycle at which the voltage level of the monitor voltage is constant. In this manner, the DC/DC unit shown in FIG. 3A serves as a constant voltage control circuit. The other components are similar to those of the DC/DC unit shown in FIG. 2A, so the description thereof is omitted.

As with the DC/DC unit shown in FIG. 2B, the DC/DC unit shown in FIG. 3B is a non-isolated boost DC/DC converter. In the DC/DC unit shown in FIG. 2B, the resistor Rm for generating the feedback signal mon4 is connected in series with the LED. On the other hand, in the DC/DC unit shown in FIG. 3B, the resistors Rm1 and Rm2 for generating the feedback signal mon4 are connected in parallel with the LED.

Accordingly, the output voltage Vout of the power supply circuit PWR is applied to the both ends of the resistors Rm1 and Rm2. The feedback signal mon4 is output from a node between the resistor Rm1 and the resistor Rm2. The feedback signal mon4 is a monitor voltage which is obtained by dividing the output voltage Vout according to a resistance ratio of the resistors Rm1 and Rm2. This feedback signal mon4 is fed back to the monitor unit MON of the processor system MCU. The PWM signal generation unit of the processor system MCU generates the PWM control pulse signal pwm having a duty ratio or a cycle at which the voltage level of the monitor voltage is constant. In this manner, the DC/DC unit shown in FIG. 3B serves as a constant voltage control circuit. The other components are similar to those of the DC/DC unit shown in FIG. 2B, so the description thereof is omitted.

Figure 4:
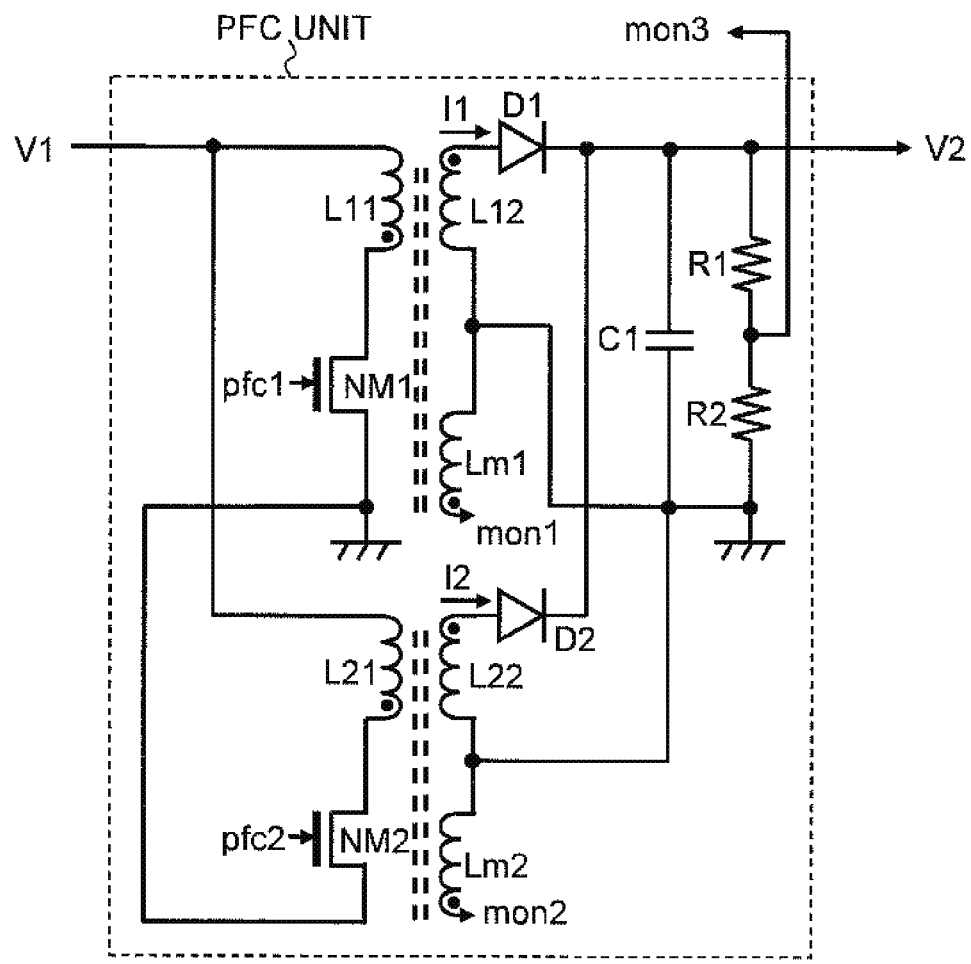
FIG. 4 is a circuit diagram showing another configuration example of a PFC unit.

Referring next to FIG. 4, another configuration of the PFC unit will be described. The PFC units shown in FIGS. 2A and 2B are non-isolated boost converters, whereas the PFC unit shown in FIG. 4 is an isolated flyback converter. The PFC units have different types, i.e., the non-isolated type and the isolated type, but have the same operating principle. The PFC unit shown in FIG. 4 includes inductors L11, L12, L21, L22, Lm1, and Lm2, the diodes D1 and D2, the NMOS transistors NM1 and NM2, and the smoothing capacitor C1.

One end of each of the inductors L11 and L21 is commonly connected to the output of the full-wave rectification circuit FWR, and is supplied with the voltage V1. The other end of the inductor L11 is connected to the drain of the NMOS transistor NM1. The other end of the inductor L2 is connected to the drain of the NMOS transistor NM2. The sources of the NMOS transistors NM1 and NM2 are grounded. The gate of the NMOS transistor NM1 receives the PFC control pulse signal pfc1, and the gate of the NMOS transistor NM2 receives the PFC control pulse signal pfc2.

The inductor L12 is electromagnetically coupled with the inductor L11 through a core. The anode of the diode D1 is connected to the other end of the inductor L12 having one end grounded. The inductor L22 is electromagnetically coupled with the inductor L21 through a core. The anode of the diode D2 is connected to the other end of the inductor L22 having one end grounded. The cathodes of the diodes D1 and D2 are commonly connected to one end of the smoothing capacitor C1. The other end of the smoothing capacitor C1 is grounded.

Here, the feedback signal mon1 corresponding to the current I1 flowing through the inductor L12 is generated by the monitor inductor Lm1 which is electromagnetically coupled with the inductor L11 through the core. This feedback signal mon1 is fed back to the monitor unit MON. Similarly, the feedback signal mon2 corresponding to the current I2 flowing through the inductor L2 is generated by the monitor inductor Lm2 which is electromagnetically coupled with the inductor L2 through the core. This feedback signal mon2 is fed back to the monitor unit MON. With this configuration, a zero current of each of the currents I1 and I2 is detected.

In parallel with the smoothing capacitor C1, the resistors R1 and R2 are connected in series. In other words, the output voltage V2 of the PFC unit is applied to the both ends of the resistors R1 and R2. The feedback signal mon3 is output from a node between the resistor R1 and the resistor R2. The feedback signal mon3 is a monitor voltage which is obtained by dividing the output voltage V2 according to a resistance ratio of the resistors R1 and R2. This feedback signal mon3 is fed back to the monitor unit MON of the processor system MCU. Thus, the duty ratio and pulse width of the PFC control pulse signals pfc1 and pfc2 are determined. In this manner, the PFC unit shown in FIG. 4 serves as a constant voltage control circuit.

Figure 5A:
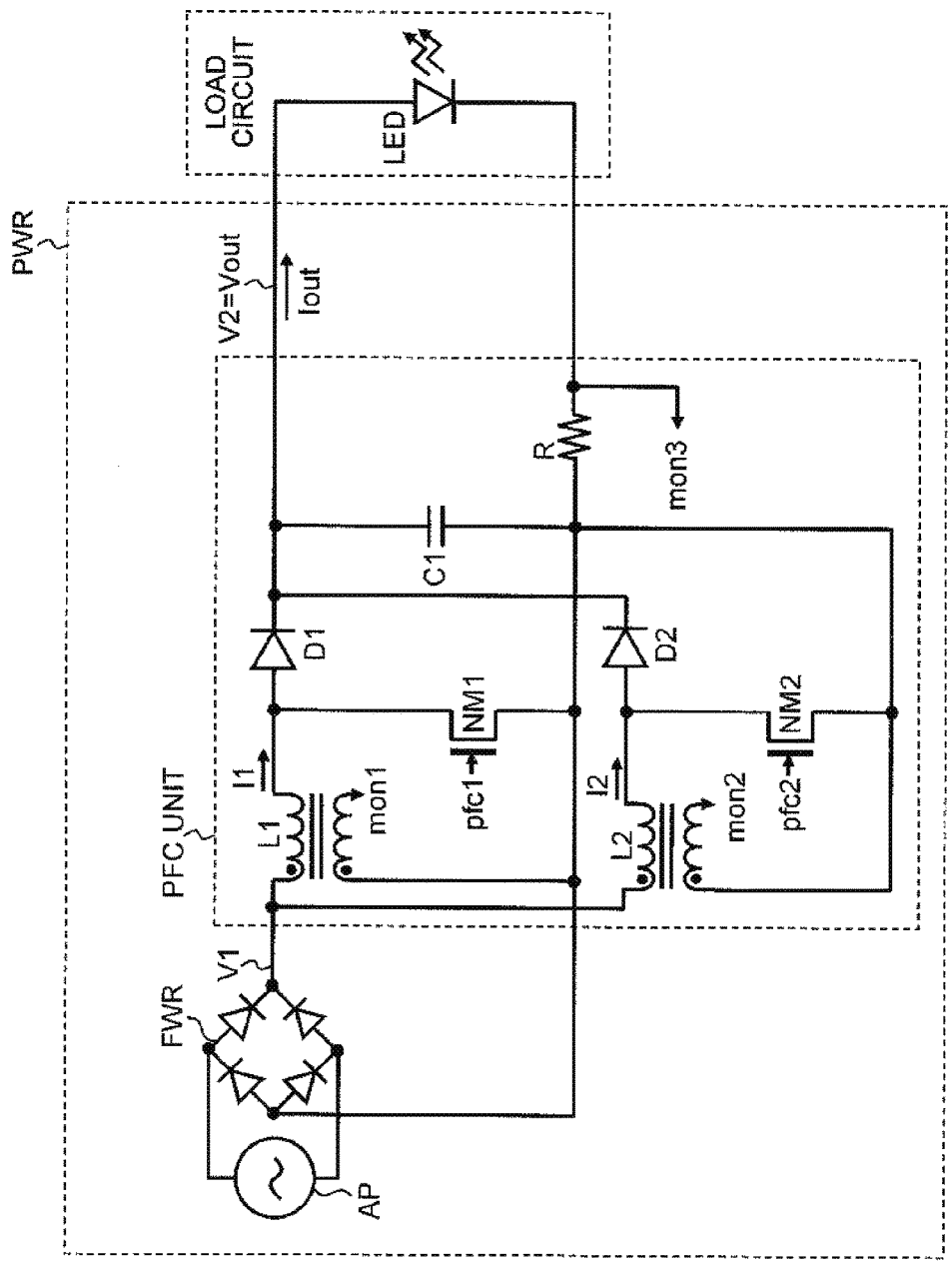
FIG. 5A is a circuit diagram showing another configuration example of the power supply circuit that drives the LED.
Figure 5B:
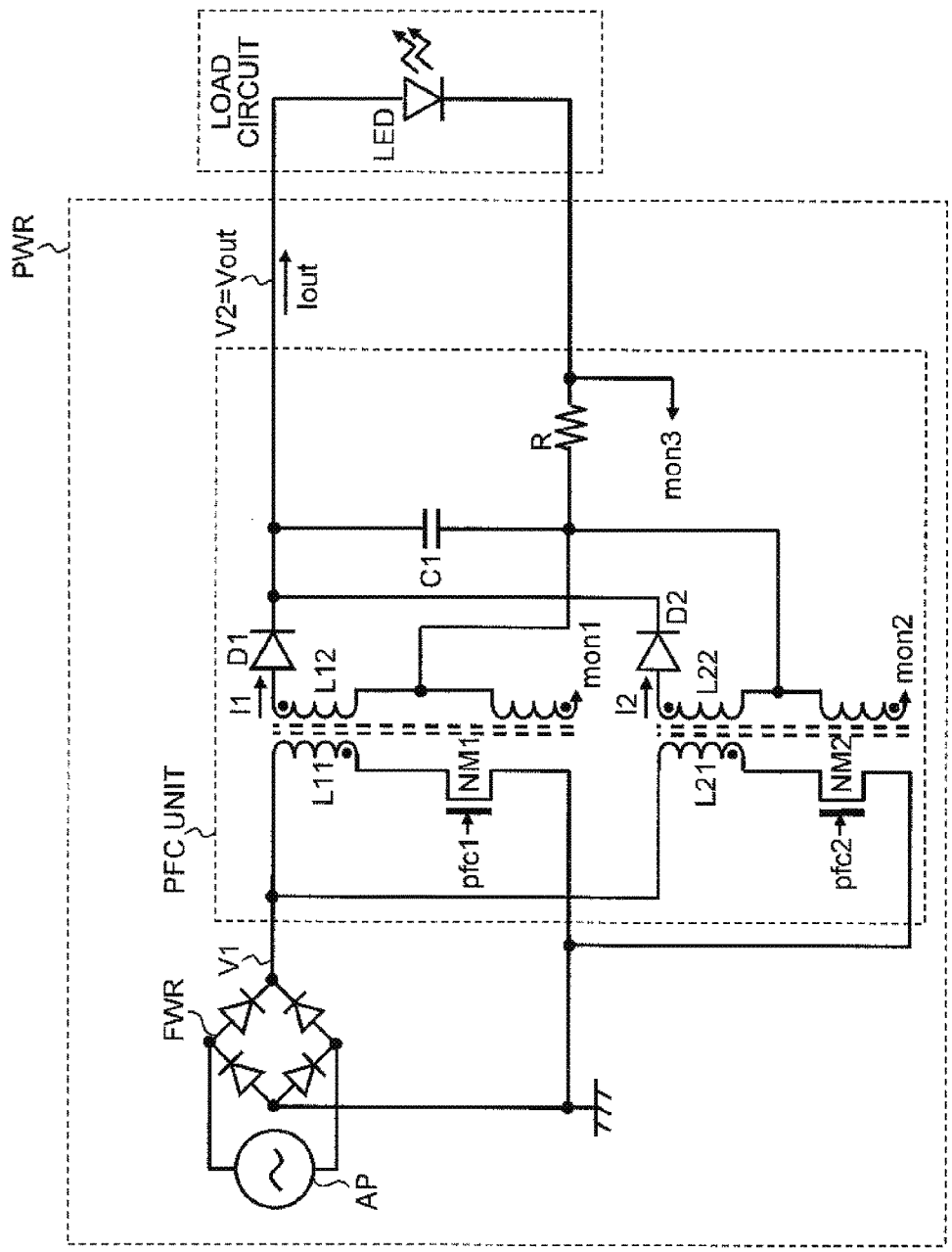
FIG. 5B is a circuit diagram showing another configuration example of the power supply circuit that drives the LED.

Referring next to FIGS. 5A and 5B, other configurations of the power supply circuit PWR will be described. As with the power supply circuits PWR shown in FIGS. 2A and 2B, in the power supply circuit PWR shown in FIG. 5A, the PFC unit is a non-isolated boost converter. In the PFC circuits shown in FIGS. 2A and 2B, the resistors R1 and R2 for generating the feedback signal mon3 are connected in parallel with the smoothing capacitor C1. On the other hand, in the PFC unit shown in FIG. 5A, a resistor R for generating the feedback signal mon3 is connected in series with the LED. That is, this PFC unit is a constant current control circuit. In this case, as shown in FIG. 5A, the DC/DC unit can be omitted and the LED can be directly connected to the PFC unit. This leads to the miniaturization of the circuit.

As with the power supply circuit PWR shown in FIG. 4, in the power supply circuit PWR shown in FIG. 5B, the PFC unit is an isolated flyback converter. In the PFC unit shown in FIG. 4, the resistors R1 and R2 for generating the feedback signal mon3 are connected in parallel with the smoothing capacitor C1. On the other hand, in the PFC unit shown in FIG. 5B, the resistor R for generating the feedback signal mon3 is connected in series with the LED. That is, this PFC unit is a constant current control circuit. In this case, as shown in FIG. 5B, the DC/DC unit can be omitted and the LED can be directly connected to the PFC unit. This leads to the miniaturization of the circuit.

Figure 6:
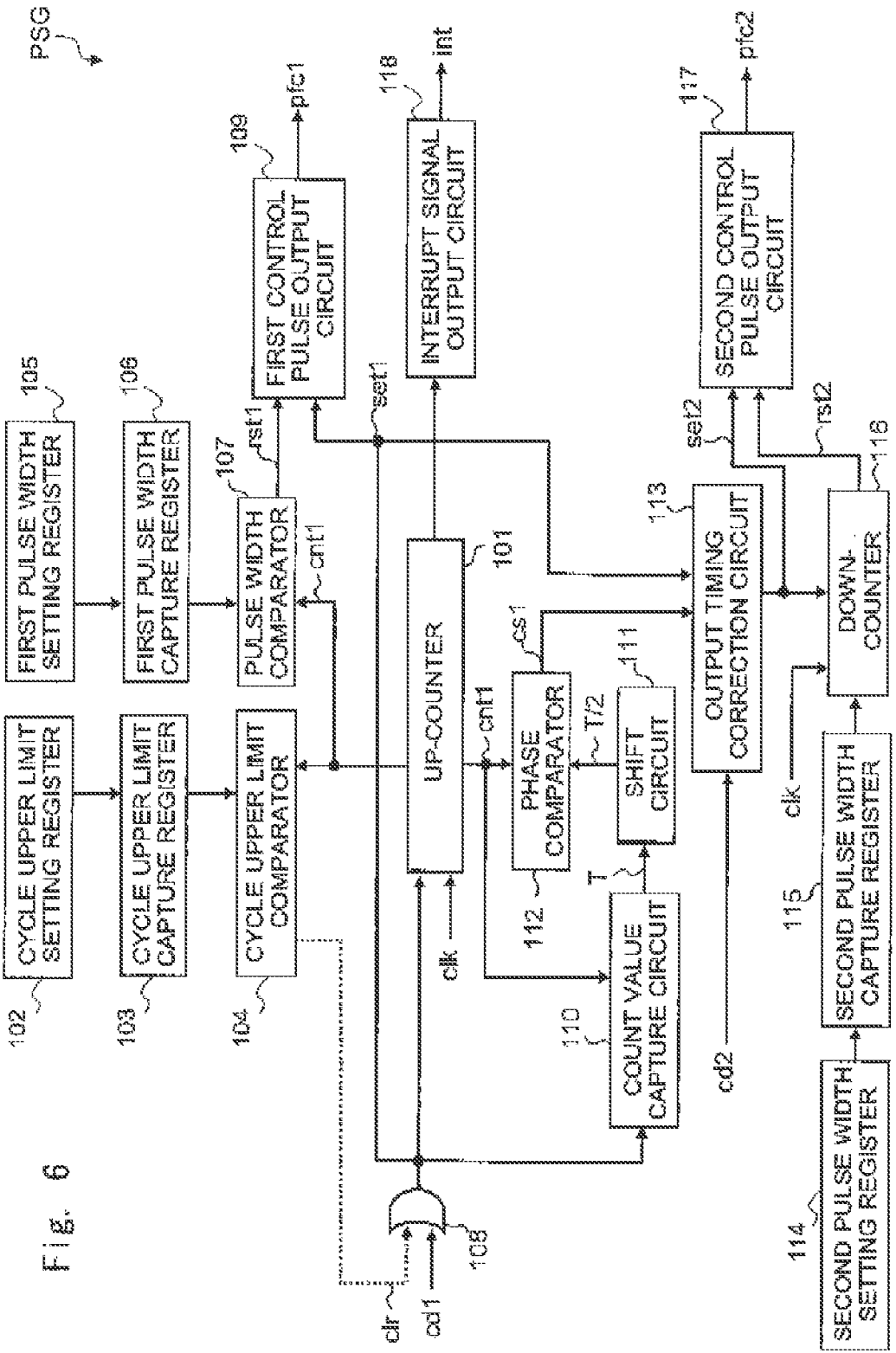
FIG. 6 is a block diagram of a PFC signal generation unit PSG according to a first embodiment.

Referring next to FIG. 6, the PFC signal generation unit PSG according to a first embodiment of the present invention will be described. FIG. 6 is a block diagram of the PFC signal generation unit PSG according to the first embodiment. As shown in FIG. 6, the PFC signal generation unit PSG includes an up-counter 101, a cycle upper limit setting register 102, a cycle upper limit capture register 103, a cycle upper limit comparator 104, a first pulse width setting register 105, a first pulse width capture register 106, a pulse width comparator 107, an OR gate 108, a first control pulse output circuit 109, a count value capture circuit 110, a shift circuit 111, a phase comparator 112, an output timing correction circuit 113, a second pulse width setting register 114, a second pulse width capture register 115, a down-counter 116, a second control pulse output circuit 117, and an interrupt signal output circuit 118.

The up-counter 101 counts up received clock signals clk. The up-counter 101 clears the count value at the timing when a zero current detection signal cd1 of the current I1 flowing through the inductor L1 is input, and newly starts counting from 0. The zero current detection signal cd1 is generated by the monitor unit MON shown in FIG. 1.

The operation core PE sets the upper limit of a cycle, which can be taken by the PFC control pulse signal pfc1, to the cycle upper limit setting register 102. As described in detail later, the cycle of the PFC control pulse signal pfc1 is basically an interval at which the zero current detection signal cd1 of the current I1 is input, and is not always constant. A cycle upper limit set value that is set to the cycle upper limit setting register 102 is a supplementary value which is used when the zero current detection signal cd1 of the current I1 is not input during start-up of the system or due to occurrence of some trouble, for example.

The cycle upper limit capture register 103 captures the cycle upper limit set value from the cycle upper limit setting register 102 at a predetermined timing.

The cycle upper limit comparator 104 is a digital comparator, and is, more specifically, a coincidence circuit. The cycle upper limit comparator 104 outputs a clear signal clr when a count value cnt1 of the up-counter 101 matches the cycle upper limit set value captured by the cycle upper limit capture register 103. When the clear signal clr is input to the up-counter 101, the count value of the up-counter 101 is cleared. Specifically, when the zero current detection signal cd1 of the current I1 is not input before the count value of the up-counter 101 reaches the set cycle upper limit set value, the count value of the up-counter 101 is forcibly cleared. As described above, the clear signal clr is exceptionally output, and thus is indicated by a dashed line in FIG. 6.

The operation core PE sets the value of the pulse width of the PFC control pulse signal pfc1 to the first pulse width setting register 105. The pulse width set value is calculated based on the duty ratio, which is determined based on the feedback signal mon3 fed back from the PFC unit, and on the cycle of the PFC control pulse signal pfc1. The cycle herein described refers to an interval at which the zero current detection signal cd1 of the current I1 is generated. The pulse width set value is updated as needed by PFC control. For example, the pulse width set value is updated at the timing when the count value of the up-counter 101 is cleared.

The first pulse width capture register 106 captures the pulse width set value from the first pulse width setting register 105 at a predetermined timing. For example, the pulse width set value is captured at the timing when the count value of the up-counter 101 is cleared.

The pulse width comparator 107 is a digital comparator, and is, more specifically, a coincidence circuit. The pulse width comparator 107 outputs a reset signal rst1 when the count value cnt1 of the up-counter 101 matches the pulse width set value captured by the first pulse width capture register 106.

The OR gate 108 receives the zero current detection signal cd1 of the current I1, and the clear signal clr output from the cycle upper limit comparator 104. The OR gate 108 outputs a set signal set1. The set signal set1 is a clear signal for clearing the count value of the up-counter 101.

The first control pulse output circuit 109 generates the PFC control pulse signal pfc1 based on the set signal set1 and the reset signal rst1, and outputs the generated signal. As described in detail later, the PFC control pulse signal pfc1 is set to an active level from an inactive level at the timing when the set signal set1 is input. On the other hand, at the timing when the reset signal rst1 is input, the PFC control pulse signal pfc1 is reset to the inactive level from the active level. That is, the PFC control pulse signal pfc1 is at the active level during the period between the timing when the set signal set1 is input and the timing when the reset signal rst1 is input.

For example, as shown in FIGS. 2A and 2B and the like, when the PFC control pulse signal pfc1 is input to the NMOS transistor, the PFC control pulse signal pfc1 is at H (High) level during the period of the active level. On the other hand, when the PFC control pulse signal pfc1 is input to a PMOS transistor (not shown), the PFC control pulse signal pfc1 is at L (Low) level during the period of the active level.

The count value capture circuit 110 captures the count value cnt1 of the up-counter 101 at the timing when the zero current detection signal cd1 of the current I1 is input. Specifically, the count value capture circuit captures the count value cnt1 of the up-counter 101 at the time when the count value is cleared, that is, a cycle value T of "the preceding cycle" (hereinafter, T represents a maximum count value of "the preceding cycle").

The shift circuit 111 shifts the cycle value T, which is captured by the count value capture circuit 110, by one bit, and generates a ½ cycle value T/2 as a target phase difference.

The phase comparator 112 is a digital comparator, and is, more specifically, a coincidence circuit. The phase comparator 112 outputs a coincidence signal cs1 when the count value cnt1 of the up-counter 101 matches the ½ cycle value T/2 generated by the shift circuit 111.

The output timing correction circuit 113 determines the timing at which a zero current detection signal cd2 of the current I2 is input, based on the set signal set1 and the coincidence signal cs1 output from the phase comparator 112, and outputs a set signal set2 at an appropriate timing. The configuration and operation of the output timing correction circuit 113 will be described in detail later.

The operation core PE sets the value of the pulse width of the PFC control pulse signal pfc2 to the second pulse width setting register 114. As in the case of the PFC control pulse signal pfc1, the pulse width set value is calculated based on the duty ratio, which is determined based on the feedback signal mon3 fed back from the PFC unit, and the cycle of the PFC control pulse signal pfc1. In other words, the pulse width set values of the PFC control pulse signals pfc1 and pfc2 are generated from the same signal, and thus are substantially the same values. However, the pulse width set values need not necessarily be the same value. This pulse width set value is updated as needed by PFC control. For example, the pulse width set value is updated at the timing when the count value of the up-counter 101 is cleared, for example.

The second pulse width capture register 115 captures the pulse width set value from the second pulse width setting register 114 at a predetermined timing. For example, the pulse width set value is captured at the timing when the count value of the count value of the up-counter 101 is cleared.

At the timing when the set signal set2 is input, the down-counter 116 starts counting down from the pulse width set value captured by the second pulse width capture register 115. The down-counter 116 counts down according to the clock signal clk, stops counting down when the count value reaches 1, and outputs a reset signal rst2. Note that when the count value reaches 1, instead of 0, the reset signal rst2 is output to thereby obtain a desired pulse width.

The second control pulse output circuit 117 generates the PFC control pulse signal pfc2 based on the set signal set2 and the reset signal rst2, and outputs the generated signal. As described in detail later, the PFC control pulse signal pfc2 is set to the active level from the inactive level at the timing when the set signal set2 is input. On the other hand, at the timing when the reset signal rst2 is input, the PFC control pulse signal pfc2 is reset to the inactive level from the active level. That is, the PFC control pulse signal pfc2 is at the active level during the period between the timing when the set signal set2 is input and the timing when the reset signal rst2 is input.

The interrupt signal output circuit 118 generates and outputs an interrupt signal int every time the count value cnt1 of the up-counter 101 is cleared. For example, the operation core PE updates the pulse width set values of the first pulse width setting register 105 and the second pulse width setting register 114 every time the operation core PE receives the interrupt signal int.

Figure 7:
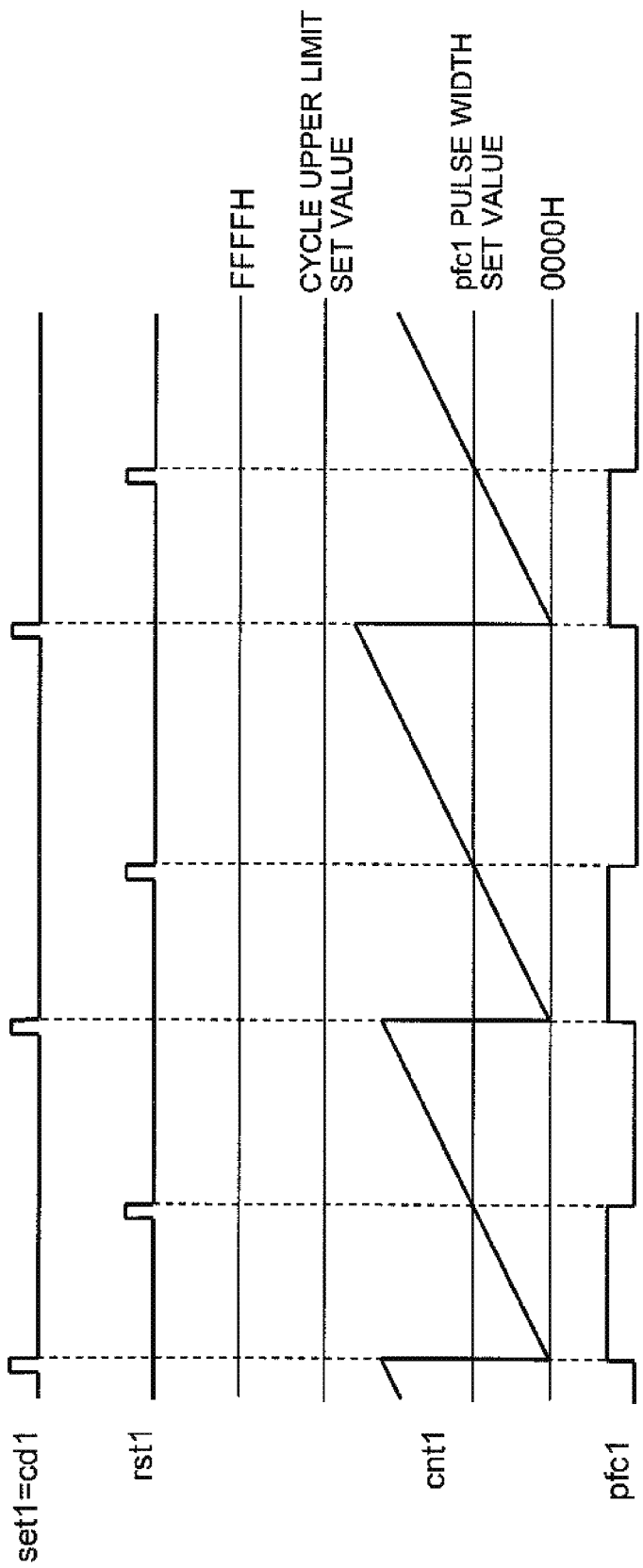
FIG. 7 is a timing diagram for explaining a method for generating a PFC control pulse signal pfc1.

Referring next to FIG. 7, a method for generating the PFC control pulse signal pfc1 will be described. FIG. 7 is a timing diagram for explaining the method for generating the PFC control pulse signal pfc1. FIG. 7 shows, sequentially from the top, the set signal set1, the reset signal rst1, the count value cnt1 of the up-counter 101, and the PFC control pulse signal pfc1.

As described above, the set signal set1 is basically the zero current detection signal cd1 of the current I1. Specifically, as shown in FIG. 7, at the timing when the zero current detection signal cd1 of the current I1 is generated, the count value cnt1 of the up-counter 101 is cleared and the PFC control pulse signal pfc1 is switched from the inactive level to the active level.

As shown in FIG. 7, the 16-bit up-counter 101 is capable of counting from 0000H to FFFFH. Accordingly, the pulse width set value of the PFC control pulse signal pfc1 and the cycle upper limit set value are values from 0000H to FFFFH. As a matter of course, the relation that the pulse width set value the cycle upper limit set value+1 holds. As described above, when the count value cnt1 of the up-counter 101 matches the pulse width set value captured by the first pulse width capture register 106, the reset signal rst1 is output from the pulse width comparator 107. At this timing, the PFC control pulse signal pfc1 is switched from the active level to the inactive level. Accordingly, the PFC control pulse signal pfc1 as shown in FIG. 7 is generated.

Figure 8:
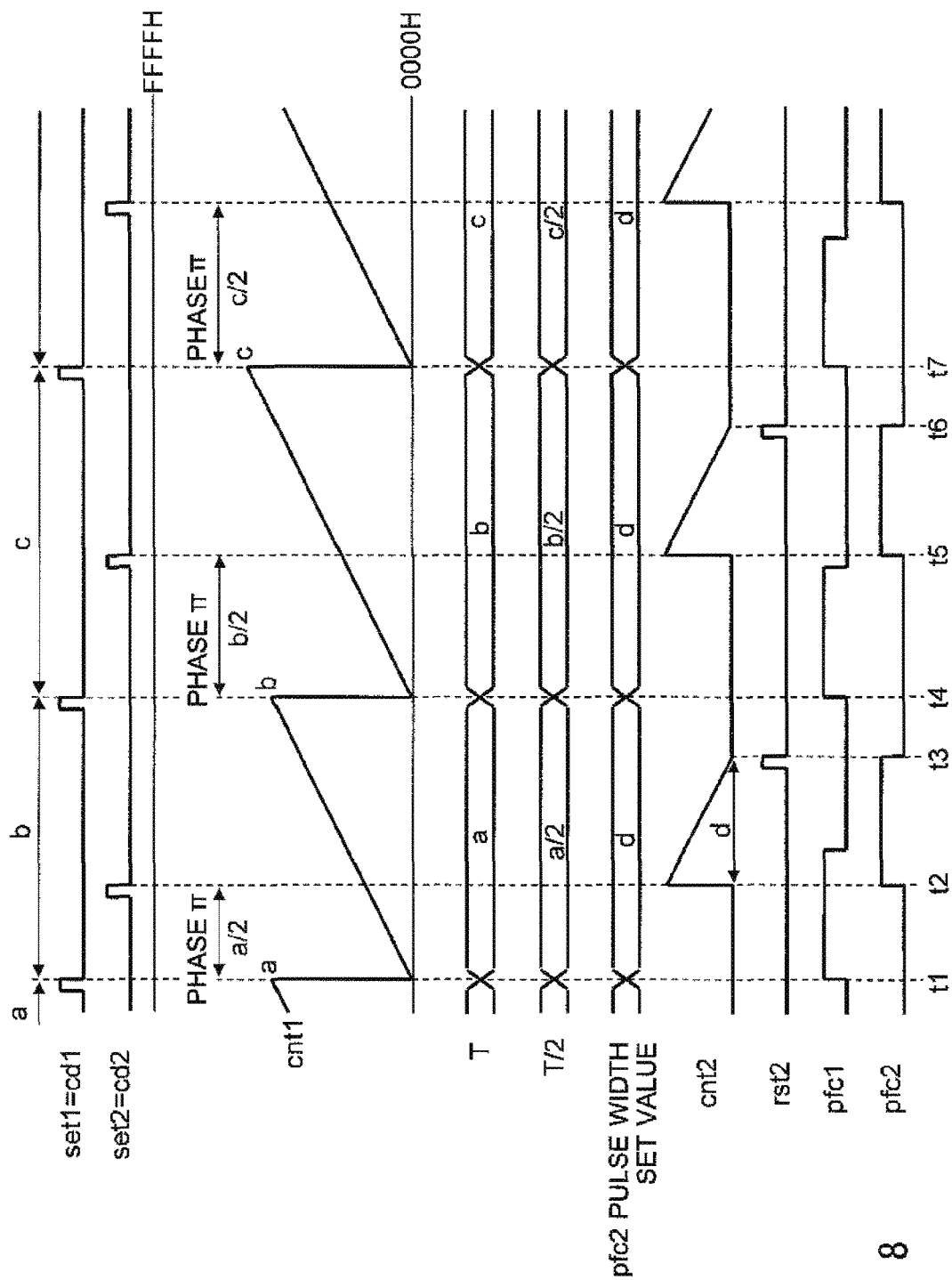
FIG. 8 is a timing diagram for explaining a method for generating a PFC control pulse signal pfc2.

Referring next to FIG. 8, a method for generating the PFC control pulse signal pfc2 will be described. FIG. 8 is a timing diagram for explaining the method for generating the PFC control pulse signal pfc2. FIG. 8 shows, sequentially from the top, the set signal set1, the set signal set2, the count value cnt1 of the up-counter 101, the cycle value T acquired by the count value capture circuit 110, the ½ cycle value T/2 output from the shift circuit 111, the pulse width set value of the PFC control pulse signal pfc2, the count value cnt2 of the down-counter 116, the reset signal rst2, the PFC control pulse signal pfc1, and the PFC control pulse signal pfc2. The description of the method for generating the control pulse signal pfc1 will be omitted.

Referring to FIG. 8, in every cycle, the set signal set2 (the zero current detection signal cd2 of the current I2) is generated at a timing shifted by the ½ cycle value T/2 from the generation timing of the set signal set1 (the zero current detection signal cd1 of the current I1). This indicates an ideal state. As shown in FIG. 8, the 16-bit up-counter 101 is capable of counting from 0000H to FFFFH. Accordingly, the pulse width set value of the PFC control pulse signal pfc1 and the cycle upper limit set value are values from 0000H to FFFFH. As a matter of course, the relation that the pulse width set value the cycle upper limit set value+1 holds.

Referring to FIG. 8, the description is made in time series. As shown in the uppermost row, the zero current detection signal cd1 of the current I1, i.e., the set signal set1 is generated at time t1. This allows the count value cnt1 of the up-counter 101 to be cleared. In this case, the count value capture circuit 110 acquires, as the cycle value T of the preceding cycle, the count value cnt1 of the up-counter 101=a at the time when the count value is cleared. That is, the cycle value T=a. Then, the shift circuit 111 shifts this value by 1 bit. Specifically, the acquired cycle value T=a is halved to obtain the ½ cycle value T/2=a/2 corresponding to the phase difference π.

Next, the zero current detection signal cd2 of the current I2 is generated at time t2 when the ½ cycle value T/2=a/2 has elapsed from time t1. This is the ideal state as described above. In this case, the set signal set2 is generated simultaneously with the zero current detection signal cd2 of the current I2. Accordingly, at this timing, the PFC control pulse signal pfc2 is switched from the inactive level to the active level. At the same time, the down-counter 116 starts counting down from the pulse width set value of the PFC control pulse signal pfc2=d which is set to the second pulse width setting register 114.

Next, at time t3 when the count value cnt2 of the down-counter 116=1 (0001H), the reset signal rst2 is generated. This allows the PFC control pulse signal pfc2 to be switched from the active level to the inactive level.

Next, at time t4, the zero current detection signal cd1 of the current I1, i.e., the set signal set1 is generated again. This allows the count value cnt1 of the up-counter 101 to be cleared. Thus, the cycle starting from time t1 ends. In this manner, the interval between the adjacent zero current detection signals cd1 of the current I1 corresponds to the cycle. The value of this cycle is represented by "b".

In the same manner as that at time t1, at time t4, the count value capture circuit 110 acquires, as the cycle value T of the preceding cycle, the count value cnt1 of the up-counter 101=b at the time when the count value is cleared. That is, the cycle value T=b. Then, the shift circuit shifts this value by 1 bit. Specifically, the acquired cycle value T=b is halved to obtain the ½ cycle value T/2=b/2 corresponding to phase difference π.

Next, at time t5 when the ½ cycle value T/2=b/2 has elapsed from time t4, the zero current detection signal cd2 of the current I2 is generated. This is the ideal state as described above. In this case, the set signal set2 is generated simultaneously with the zero current detection signal cd2 of the current I2. Accordingly, at this timing, the PFC control pulse signal pfc2 is switched from the inactive level to the active level. At the same time, the down-counter 116 starts counting down from the pulse width set value of the PFC control pulse signal pfc2=d which is set to the second pulse width setting register 114.

Next, at time t6 when the count value cnt2 of the down-counter 116=1(0001H), the reset signal rst2 is generated. This allows the PFC control pulse signal pfc2 to be switched from the active level to the inactive level.

Next, at time t7, the zero current detection signal cd1 of the current I1, i.e., the set signal set1 is generated again. This allows the count value cnt1 of the up-counter 101 to be cleared. Thus, the cycle starting from time t4 ends. The value of this cycle is represented by "c". As described above, the PFC control pulse signal pfc2 as shown in FIG. 8 is generated.

The ideal state has been described above with reference to FIG. 8. However, the zero current detection signal cd2 of the current I2 is not necessarily generated at the timing shifted by the ½ cycle value T/2 from the generation timing of the zero current detection signal cd1 of the current I1. In order to balance the high efficiency due to the detection of the zero current of the current I2 and the high efficiency achieved by setting the phase difference π between the PFC control pulse signals pfc1 and pfc2, the PFC signal generation unit PSG of this embodiment is provided with the output timing correction circuit 113. This output timing correction circuit 113 corrects the output timing of the set signal set2 according to the generation timing of the zero current detection signal cd2 of the current I2 with respect to the generation timing of the zero current detection signal cd1 of the current I1. The output of the set signal set2 allows the PFC control pulse signal pfc2 to be switched from the inactive level to the active level.

Figure 9:
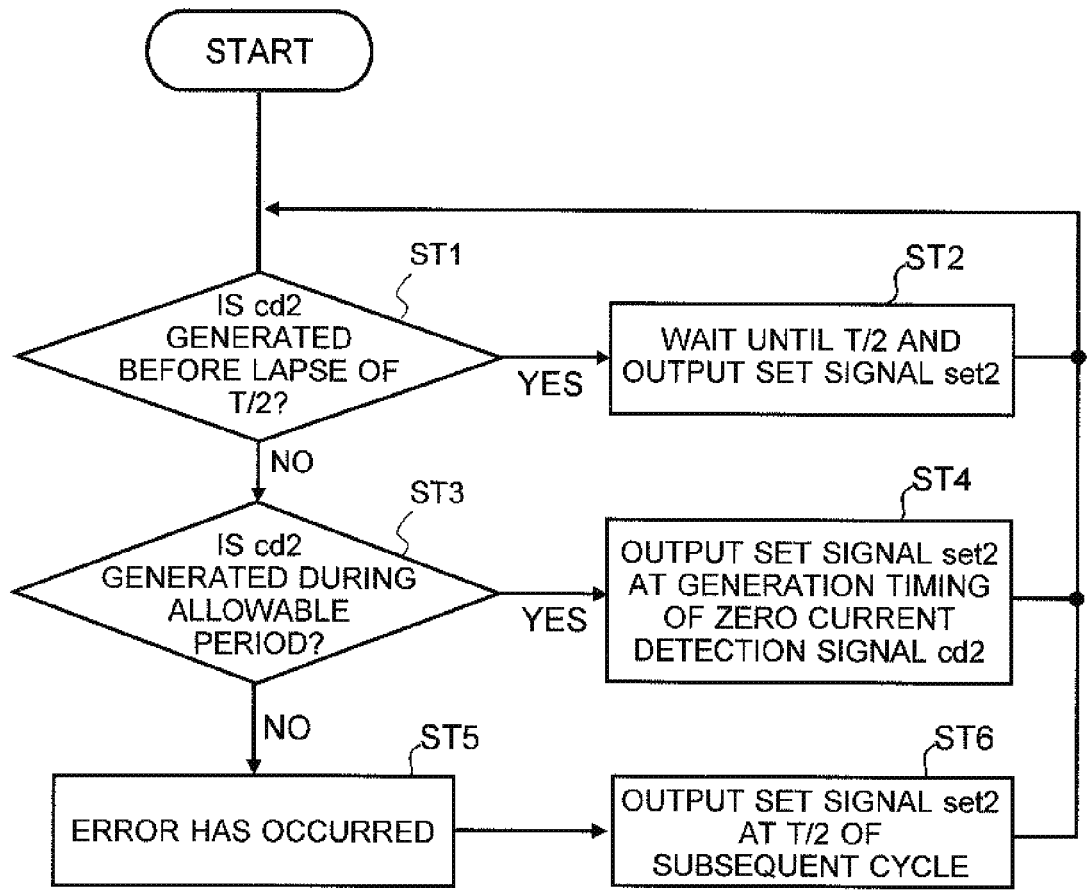
FIG. 9 is a flowchart showing a processing flow of an output timing correction circuit 113.

Referring now to FIG. 9, a specific processing flow of the output timing correction circuit 113 will be described. FIG. 9 is a flowchart showing a processing flow of the output timing correction circuit 113.

First, the output timing correction circuit 113 determines, in each cycle, whether the zero current detection signal cd2 of the current I2 is generated or not before the lapse of the time of the ½ cycle value T/2 (T represents the cycle value of the preceding cycle) from the start (step ST1). When the zero current detection signal cd2 of the current I2 is generated during the period from the start to the lapse of the ½ cycle value T/2 (YES in step ST1), the output timing correction circuit 113 waits until the ½ cycle value T/2 is reached, and outputs the set signal set2 (step ST2). In this case, needless to say, T/2 is most preferable as the target phase difference, but the target phase difference may be 3/8T to 5/8T. A target phase difference of 7/16T to 9/16T is more preferable in terms of improvement in efficiency.

Next, when the zero current detection signal cd2 of the current I2 is not generated during the period from the start to the lapse of the time of the ½ cycle value T/2 (NO in step ST1), it is determined whether the zero current detection signal cd2 of the current I2 is generated within a predetermined allowable period from the ½ cycle value T/2 (step ST3). When the zero current detection signal cd2 of the current I2 is generated within the allowable period (YES in step ST3), the output timing correction circuit 113 outputs the set signal set2 at the timing when the zero current detection signal cd2 of the current I2 is generated (step ST4). This allows the PFC control pulse signal pfc2 to be switched from the inactive level to the active level. The allowable period is preferably in the range from T/64 to T/8. When the allowable period is in the range of less than T/64, errors occur more frequently, which is unfavorable in terms of system operation. On the other hand, the allowable period in the range of more than T/8 does not contribute to the power factor correction in the PFC circuit.

Next, when the zero current detection signal cd2 of the current I2 is not generated within the allowable period (NO in step ST3), the output timing correction circuit 113 determines that an error has occurred (step ST5). Then, the output timing correction circuit 113 forcibly outputs the set signal set2 at the timing when the time of the ½ cycle value T/2 has elapsed from the start of the subsequent cycle, without outputting the set signal set2 in the cycle (step ST6). The above-described process is repeatedly executed in each cycle.

Figure 10:
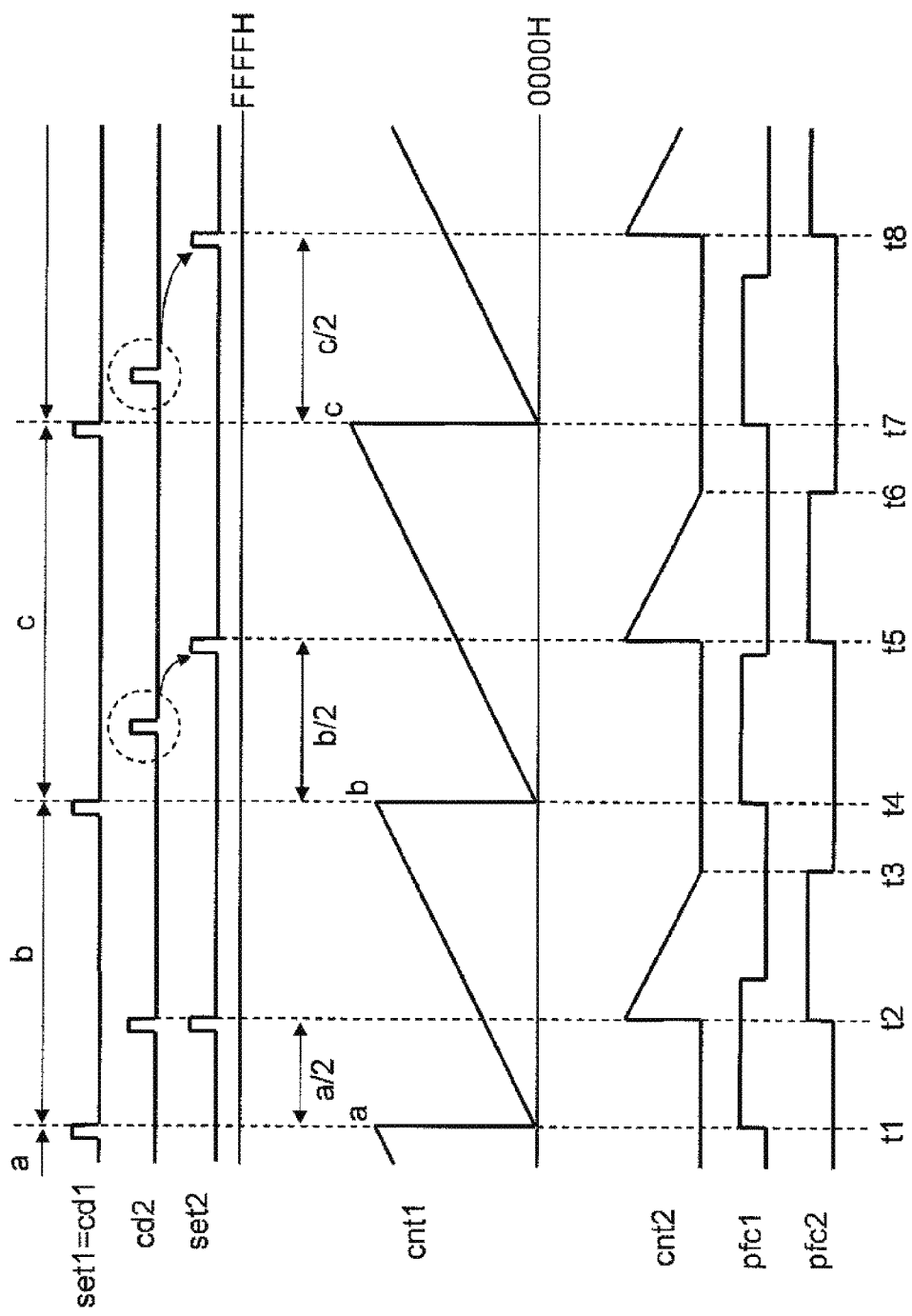
FIG. 10 is a timing diagram for explaining a method for generating the PFC control pulse signal pfc2.
Figure 11:
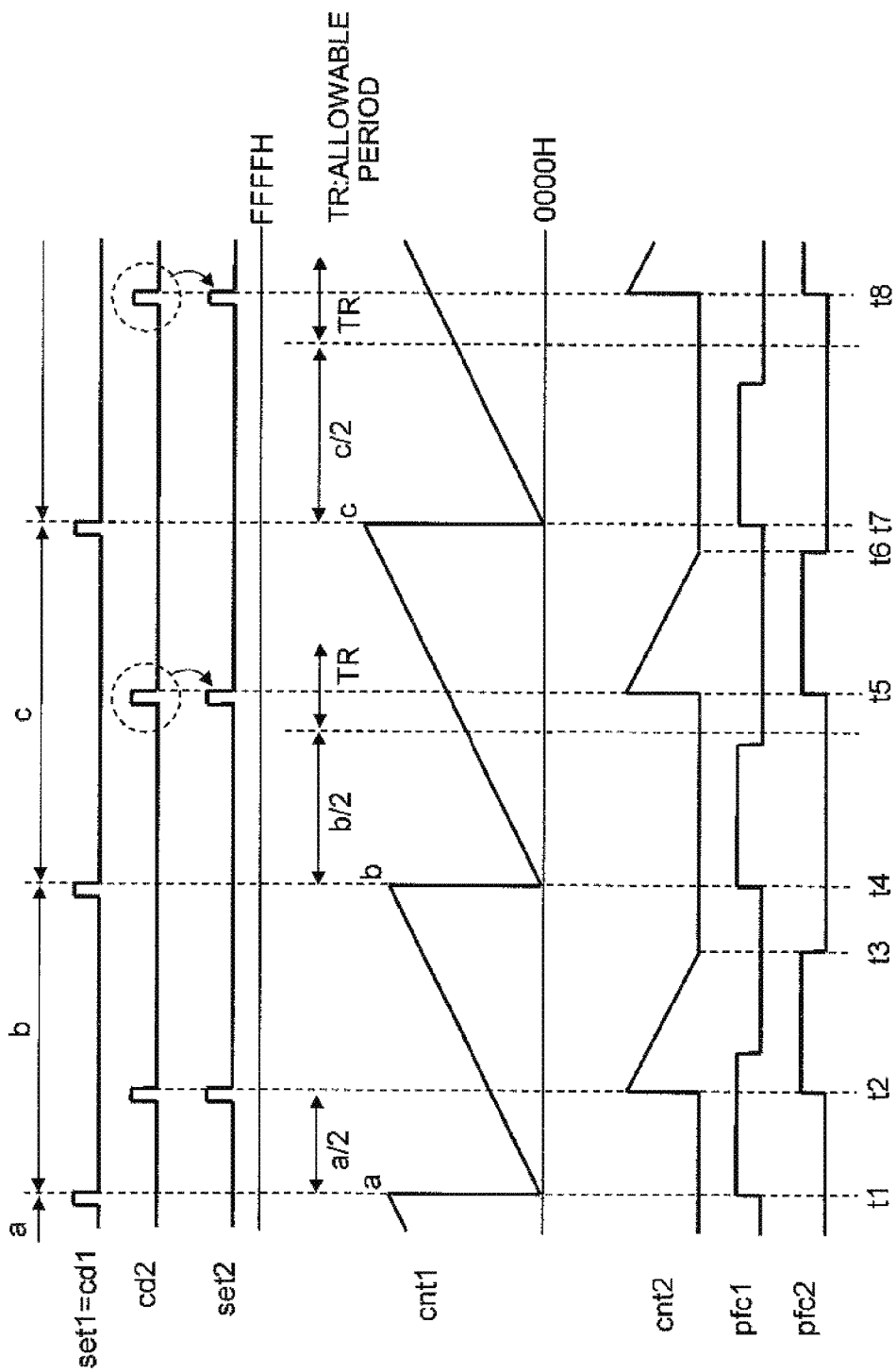
FIG. 11 is a timing diagram for explaining a method for generating the PFC control pulse signal pfc2.
Figure 12:
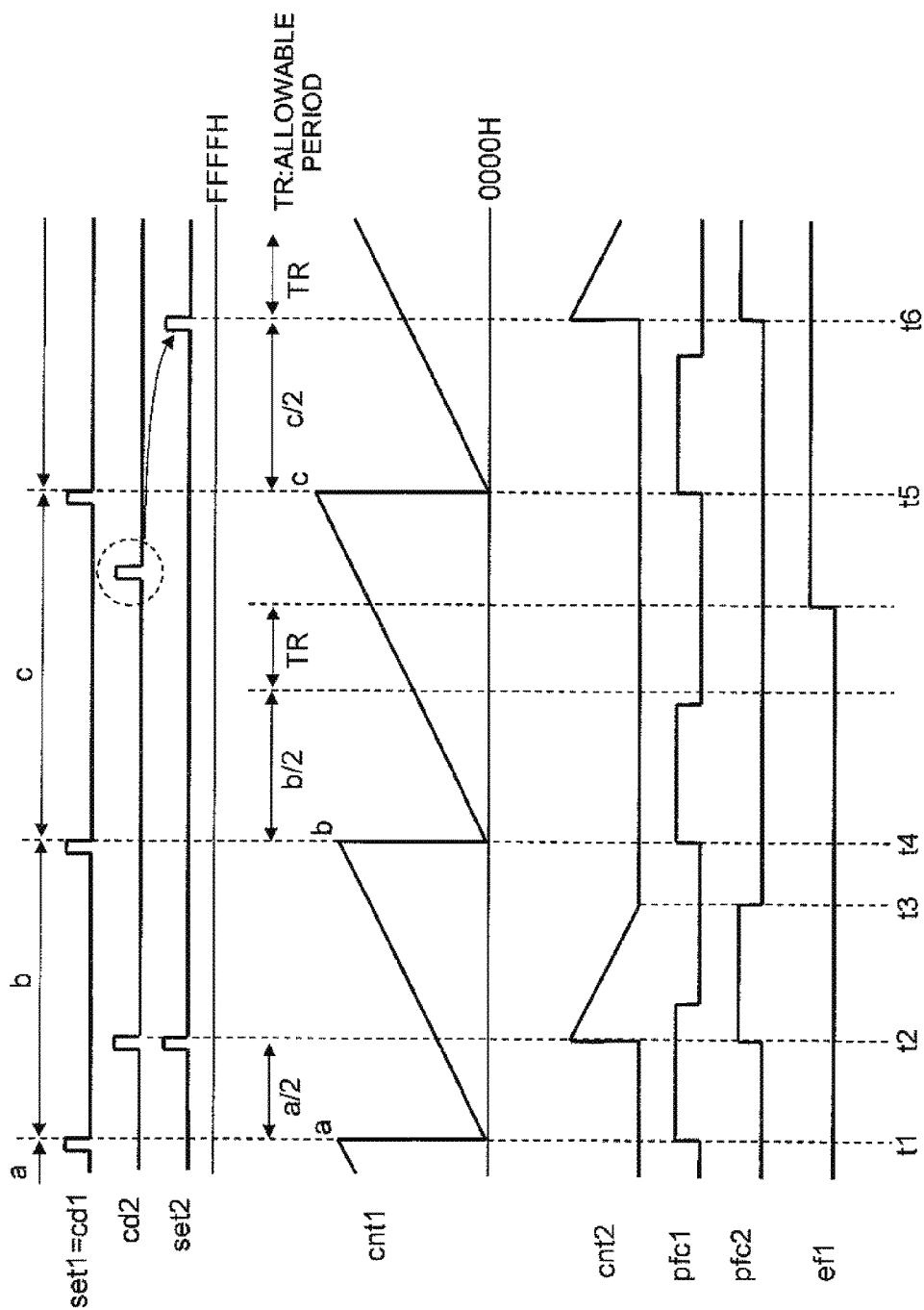
FIG. 12 is a timing diagram for explaining a method for generating the PFC control pulse signal pfc2.

Next, each process shown in FIG. 9 will be described with reference to the timing diagrams of FIGS. 10 to 12. As with FIG. 8, FIGS. 10 to 12 are timing diagrams for explaining the method for generating the PFC control pulse signal pfc2. Each of FIGS. 10 to 12 shows, sequentially from the top, the set signal set1, the zero current detection signal cd2 of the current I2, the set signal set2, the count value cnt1 of the up-counter 101, the count value cnt2 of the down-counter 116, the reset signal rst2, the PFC control pulse signal pfc1, and the PFC control pulse signal pfc2. FIG. 12 also shows an error flag ef1 in the lowermost row.

First, FIG. 10 will be described. The initial cycle starting from time t1 is in the ideal state. On the other hand, in the two subsequent cycles, the zero current detection signal cd2 of the current I2 is generated during the period from the start to the ½ cycle value T/2.

Referring to FIG. 10, the description is made in time series. The period from time t1 to time t4 is in the ideal state as in FIG. 8, so the description thereof is omitted. First, when the zero current detection signal cd1 of the second current I1, i.e., the set signal set1 is generated at time t4, the count value cnt1 of the up-counter 101 is cleared. In the cycle starting from time t4, the cycle value T of the preceding cycle=b.

Next, the zero current detection signal cd2 of the current I2 is generated during the period from time t4 to time t5 when the ½ cycle value T/2=b/2 has elapsed. In this case, as described above, the output timing correction circuit 113 waits until time t5 and outputs the set signal set2, without outputting the set signal set2 at the generation timing of the zero current detection signal cd2. At this timing, the PFC control pulse signal pfc2 is switched from the inactive level to the active level. At the same time, the down-counter 116 starts counting down from the pulse width set value of the PFC control pulse signal pfc2.

Next, at time t6 when the count value cnt2 of the down-counter 116=1(0001H), the reset signal rst2 is generated. This allows the PFC control pulse signal pfc2 to be switched from the active level to the inactive level.

Next, at time t7, the zero current detection signal cd1 of the current I1, i.e., the set signal set1 is generated again. This allows the count value cnt1 of the up-counter 101 to be cleared. Thus, the cycle starting from time t4 ends. In the cycle starting from time t7, the cycle value T of the preceding cycle=c.

Also in the cycle starting from time t7, during the period from time t7 to time t8 when the ½ cycle value T/2=c/2 has elapsed, the zero current detection signal cd2 of the current I2 is generated. Accordingly, in the same manner as described above, the output timing correction circuit 113 waits until time t8 and outputs the set signal set2, without outputting the set signal set2 at the generation timing of the zero current detection signal cd2.

Next, FIG. 11 will be described. The initial cycle starting from time t1 is in the ideal state. On the other hand, in the two subsequent cycles, the zero current detection signal cd2 of the current I2 is generated during an allowable period TR from the ½ cycle value T/2.

Referring to FIG. 11, the description is made in times series. The period from time t1 to time t4 is in the ideal state as in FIG. 8, so the description thereof is omitted. First, when the second zero current detection signal cd1 of the current I1, i.e., the set signal set1 is generated at time t4, the count value cnt1 of the up-counter 101 is cleared. In the cycle starting from time t4, the cycle value T of the preceding cycle=b.

Next, at time t5 in the allowable period TR from the ½ cycle value T/2=b/2, the zero current detection signal cd2 of the current I2 is generated. In this case, as described above, the output timing correction circuit 113 outputs the set signal set2 at time t5 when the zero current detection signal cd2 is generated. At this timing, the PFC control pulse signal pfc2 is switched from the inactive level to the active level. At the same time, the down-counter 116 starts counting down from the pulse width set value of the PFC control pulse signal pfc2.

Next, at time t6 when the count value cnt2 of the down-counter 116=1(0001H), the reset signal rst2 is generated. This allows the PFC control pulse signal pfc2 to be switched from the active level to the inactive level.

Next, at time t7, the zero current detection signal cd1 of the current I1, i.e., the set signal set1 is generated again. This allows the count value cnt1 of the up-counter 101 to be cleared. Thus, the cycle starting from time t4 ends. In the cycle starting from time t7, the cycle value T of the preceding cycle=c.

Also in the cycle starting from time t7, the zero current detection signal cd2 of the current I2 is generated at time t8 in the allowable period TR from the ½ cycle value T/2=c/2. Accordingly, in the manner as described above, the output timing correction circuit 113 outputs the set signal set2 at time t8 when the zero current detection signal cd2 is generated.

Next, FIG. 12 will be described. The initial cycle starting from time t1 is in the ideal state. On the other hand, in the subsequent cycle, the zero current detection signal cd2 of the current I2 is generated at a timing after the allowable period TR from time T/2.

Referring to FIG. 12, the description is made in time series. The period from time t1 to time t4 is in the ideal state as in FIG. 8, so the description thereof is omitted. First, when the second zero current detection signal cd1 of the current I1, i.e., the set signal set1 is generated at time t4, the count value cnt1 of the up-counter 101 is cleared. In the cycle starting from time t4, the cycle value T of the preceding cycle=b.

Here, the zero current detection signal cd2 of the current I2 is generated at a timing after the allowable period TR from the ½ cycle value T/2=b/2. In this case, as described above, the output timing correction circuit 113 forcibly outputs the set signal set2 at the ½ cycle value T/2 from the start of the subsequent cycle, without outputting the set signal set2 in the cycle. At a timing after the allowable period TR, the error flag ef1 is switched from L to H.

Next, at time t5, the zero current detection signal cd1 of the current I1, i.e., the set signal set1 is generated again. This allows the count value cnt1 of the up-counter 101 to be cleared. Thus, the cycle starting from time t4 ends. In the cycle starting from time t5, the cycle value T of the preceding cycle=c. Then, as described above, the output timing correction circuit 113 forcibly outputs the set signal set2 at the ½ cycle value T/2=c/2 (time t6) of the cycle starting from time t5.

Figure 13:
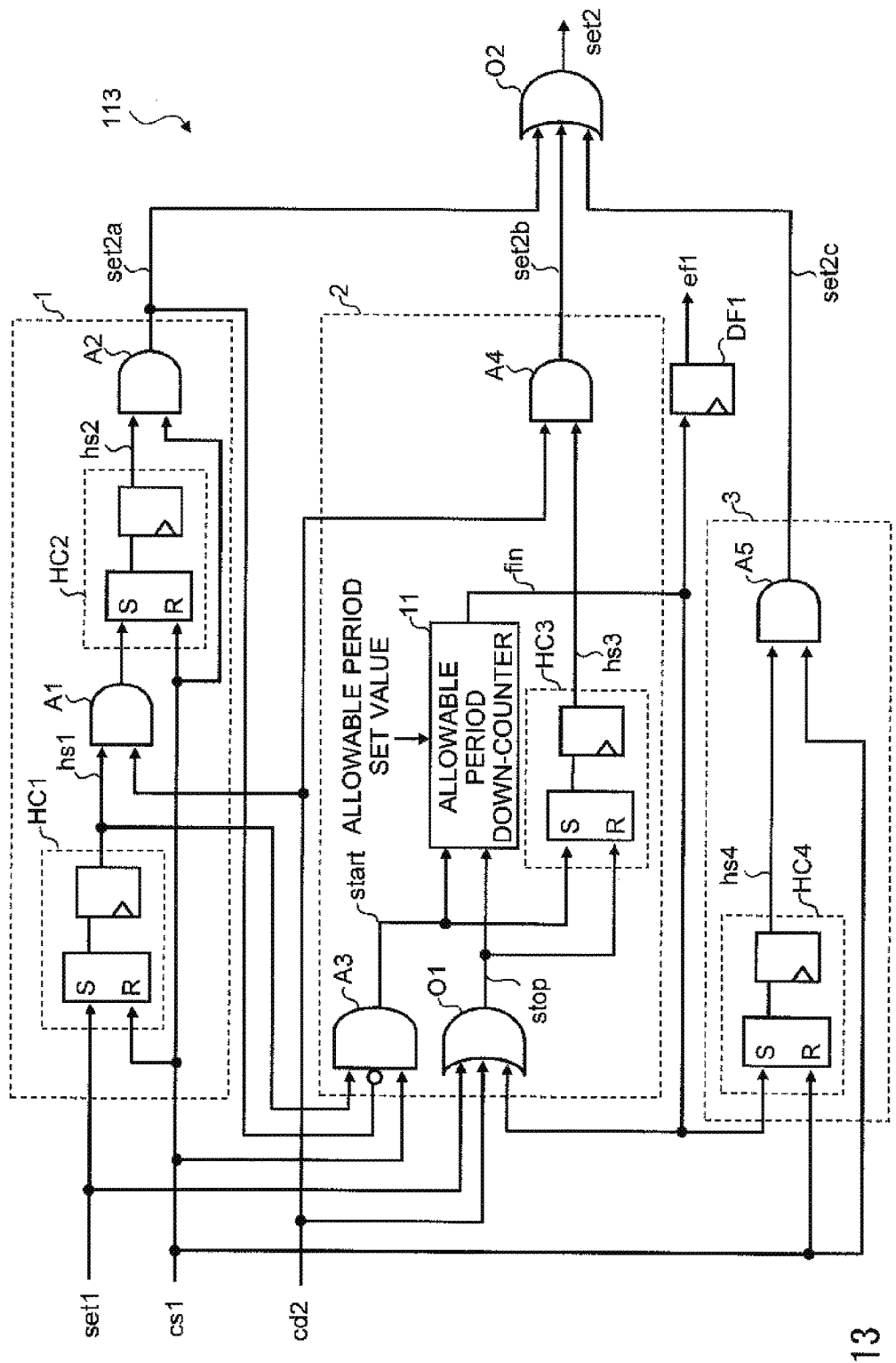
FIG. 13 is a circuit diagram showing a specific circuit configuration of the output timing correction circuit 113.

Referring next to FIG. 13, a specific circuit configuration of the output timing correction circuit 113 will be described. The circuit configuration described below is by way of example only. FIG. 13 is a circuit diagram showing an example of a specific circuit configuration of the output timing correction circuit 113. As shown in FIG. 13, the output timing correction circuit 113 includes a first circuit 1, a second circuit 2, a third circuit 3, a D flip-flop DF1, and an OR gate O2. The first circuit 1 includes holding circuits HC1 and HC2 and AND gates A1 and A2. The second circuit 2 includes a holding circuit HC3, AND gates A3 and A4, an OR gate O1, and an allowable period down-counter 11. The third circuit 3 includes a holding circuit HC4 and an AND gate A5. Each of the holding circuits HC1 to HC4 is composed of a D flip-flop. In the preceding-stage, "S" and "R" respectively represent a set input and a reset input corresponding to a data input of each D flip-flop. The clock signal clk is input to a clock input of each D flip-flop.

When the zero current detection signal cd2 of the current I2 is generated during the period of the ½ cycle value T/2 (T represents the cycle value of the preceding cycle) after the time when the set signal 1 is input and the count value cnt1 of the up-counter is cleared, the first circuit 1 waits until the ½ cycle value T/2 is reached and outputs a set signal set2a.

The connection relationship will be described below. The set input S of the holding circuit HC1 receives the set signal set1, and the reset input R receives the coincidence signal cs1 output from the phase comparator 112. An output signal of the holding circuit HC1 is a period signal hs1 from the start of the cycle to the ½ cycle value T/2. This period signal hs1 is input to one input of the AND gate A1. The zero current detection signal cd2 of the current I2 is input to the other input of the AND gate A1.

An output signal of the AND gate A1 is input to the set input S of the holding circuit HC2. The coincidence signal cs1 is input to the reset input R of the holding circuit HC2. An output signal of the holding circuit HC1 is a held signal hs2 to be held until the ½ cycle value T/2 is reached, when the zero current detection signal cd2 of the current I2 is input before the ½ cycle value T/2 is reached. This held signal hs2 is input to one input of the AND gate A2. The coincidence signal cs1 is input to the other input of the AND gate A2. An output signal of the AND gate A2 is an output signal of the first circuit 1, that is, the set signal set2a which constitutes one set signal set2.

When the zero current detection signal cd2 of the current I2 is generated within the allowable period, the second circuit 2 outputs a set signal set2b at the timing.

The connection relationship will be described below. The AND gate A3 receives three signals, i.e., the period signal hs1, the inverted signal of the set signal set2a, and the coincidence signal cs1. An output signal of the AND gate A3 is a count start signal start for causing the down-counter 11 to start counting down. This count start signal start is input to the down-counter 11, and is also input to the set input S of the holding circuit HC3.

The OR gate O1 receives three signals, i.e., the set signal set1, the zero current detection signal cd2 of the current I2, and a count end signal fin output from the down-counter 11. An output signal of the OR gate O1 is a count stop signal stop for causing the down-counter 11 to stop counting down. This count stop signal stop is input to the down-counter 11, and is also input to the reset input R of the holding circuit HC3. The down-counter 11 counts down the allowable period set values stored in the register. After finishing counting down the allowable periods, the down-counter 11 outputs the count end signal fin.

An output signal of the holding circuit HC3 is a determination period signal hs3 for determining whether the zero current detection signal cd2 of the current I2 is input during the allowable period. This determination period signal hs3 is input to one input of the AND gate A4. The zero current detection signal cd2 of the current I2 is input to the other input of the AND gate A4. An output signal of the AND gate A4 is an output signal of the second circuit 2, that is, the set signal set2b which constitutes one set signal set2.

When the zero current detection signal cd2 of the current I2 is not generated within the allowable period, the third circuit 3 forcibly outputs a set signal set2c at the ½ cycle value T/2 from the start of the subsequent cycle.

The connection relationship will be described below. The set input S of the holding circuit HC4 receives the count end signal fin output from the down-counter 11, and the reset input R receives the coincidence signal cs1. An output signal of the holding circuit HC1 is a held signal hs4 to be held until the ½ cycle value T/2 of the subsequent cycle is reached. This held signal hs4 is input to one input of the AND gate A5. The coincidence signal cs1 is input to the other input of the AND gate A5. An output signal of the AND gate A5 is an output signal of the third circuit 3, that is, the set signal set2c which constitutes one set signal set2.

When the count end signal fin is generated, the D flip-flop DF1 captures this signal, and outputs the error flag ef1. The OR gate O2 receives the set signals set2a, set2b, and set2c, which are outputs from the first to third circuits, respectively, and outputs the set signal set2.

Figure 14:
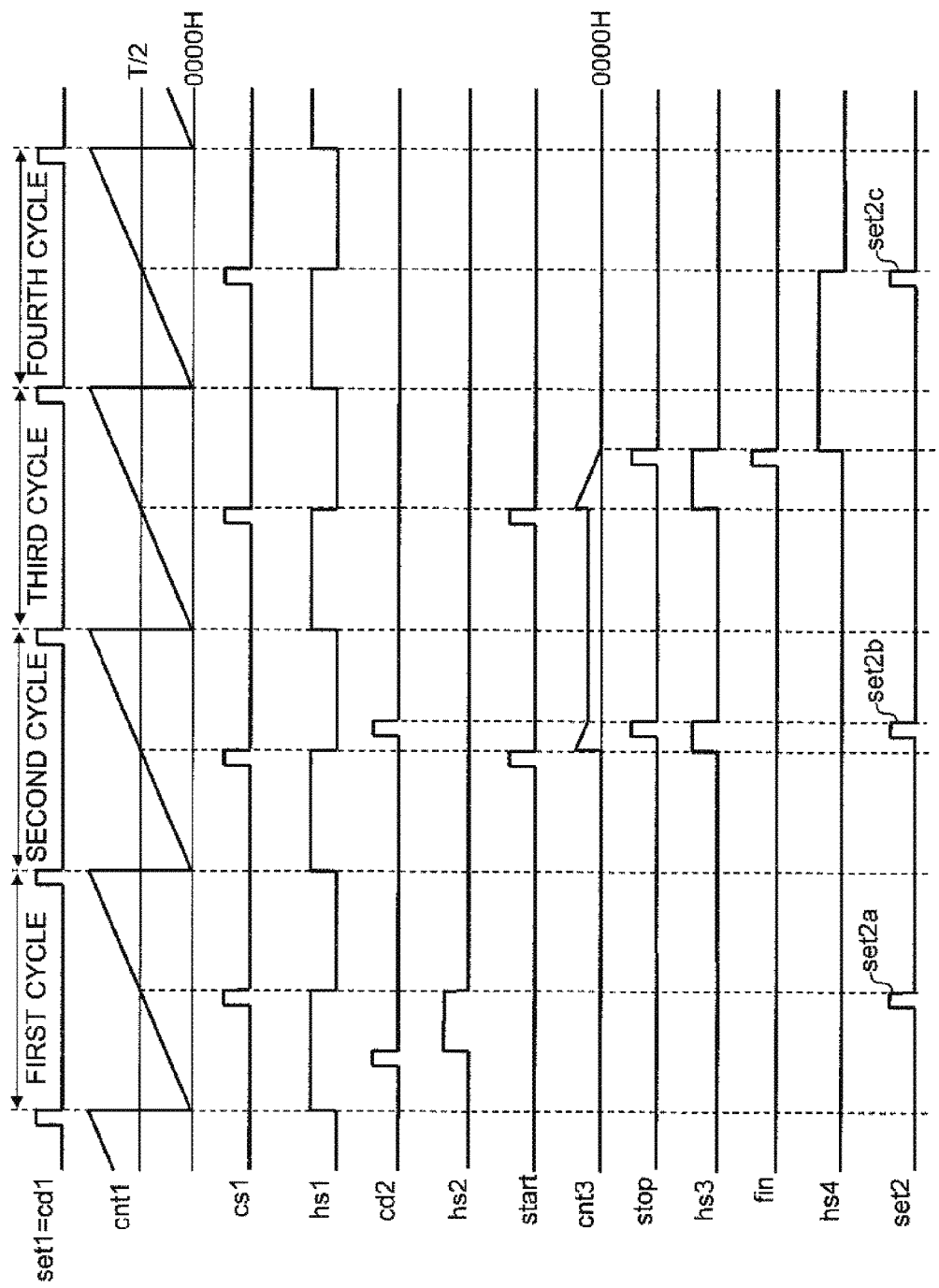
FIG. 14 is a timing diagram for explaining an operation of the output timing correction circuit 113.

Next, an operation of the output timing correction circuit 113 shown in FIG. 13 will be described with reference to the timing diagram of FIG. 14. FIG. 14 is a timing diagram for explaining an operation of the output timing correction circuit 113. FIG. 14 shows, sequentially from the top, the set signal set1, the count value cnt1 of the up-counter 101, the coincidence signal cs1, the period signal hs1, the zero current detection signal cd2 of the current I2, the held signal hs2, the count start signal start of the allowable period down-counter 11, the count value cnt3 of the allowable period down-counter 11, the count stop signal stop of the allowable period down-counter 11, the determination period signal hs3, the count end signal fin of the allowable period down-counter 11, the held signal hs4, and the set signal set2.

A first cycle shown in FIG. 14 indicates a case in which the zero current detection signal cd2 of the current I2 is generated during the period from the start to the ½ cycle value T/2. Here, the period signal hs1 indicating the period from the start to the ½ cycle value T/2 is held at H in this period. At the timing when the zero current detection signal cd2 is input, the held signal hs2 shifts from L to H and is held. At the timing when the coincidence signal cs1 indicating the lapse of the ½ cycle value T/2 is input, the held signal hs2 shifts from H to L, and the set signal set2$a$ is output. Note that the term "first cycle" is used for convenience to distinguish cycles, and this does not indicate that the operation is started from the first cycle.

A second cycle shown in FIG. 14 indicates a case in which the zero current detection signal cd2 of the current I2 is generated within the allowable period from the ½ cycle value T/2. At the timing when the coincidence signal cs1 indicating the lapse of the ½ cycle value T/2 is input, the count start signal start of the allowable period down-counter 11 is generated, and the allowable period down-counter 11 starts counting down. Then, the determination period signal hs3 shifts from L to H. At the timing when the zero current detection signal cd2 of the current I2 is input, the count stop signal stop of the allowable period down-counter 11 is generated, and the allowable period down-counter 11 stops counting down. Then, the determination period signal hs3 shifts from H to L. At the same time, the set signal set2$b$ is output.

In third and fourth cycles shown in FIG. 14, the zero current detection signal cd2 of the current I2 is not generated. Accordingly, at the timing when the coincidence signal cs1 indicating the lapse of the ½ cycle value T/2 is input, the count start signal start of the allowable period down-counter 11 is generated, and the allowable period down-counter 11 starts counting down. Then, the determination period signal hs3 shifts from L to H. Since the zero current detection signal cd2 of the current I2 is not input, the allowable period down-counter 11 counts down the allowable periods to the end, and outputs the count end signal fin. At the same time, the count stop signal stop of the allowable period down-counter 11 is generated, and the allowable period down-counter 11 stops counting down. Then, the determination period signal hs3 shifts from H to L. At the same time, the held signal hs4 shifts from L to H and is held. At the timing when the coincidence signal cs1 indicating the lapse of the ½ cycle value T/2 in the fourth cycle, the held signal hs2 shifts from H to L, and the set signal set2$c$ is output.

Figure 15:
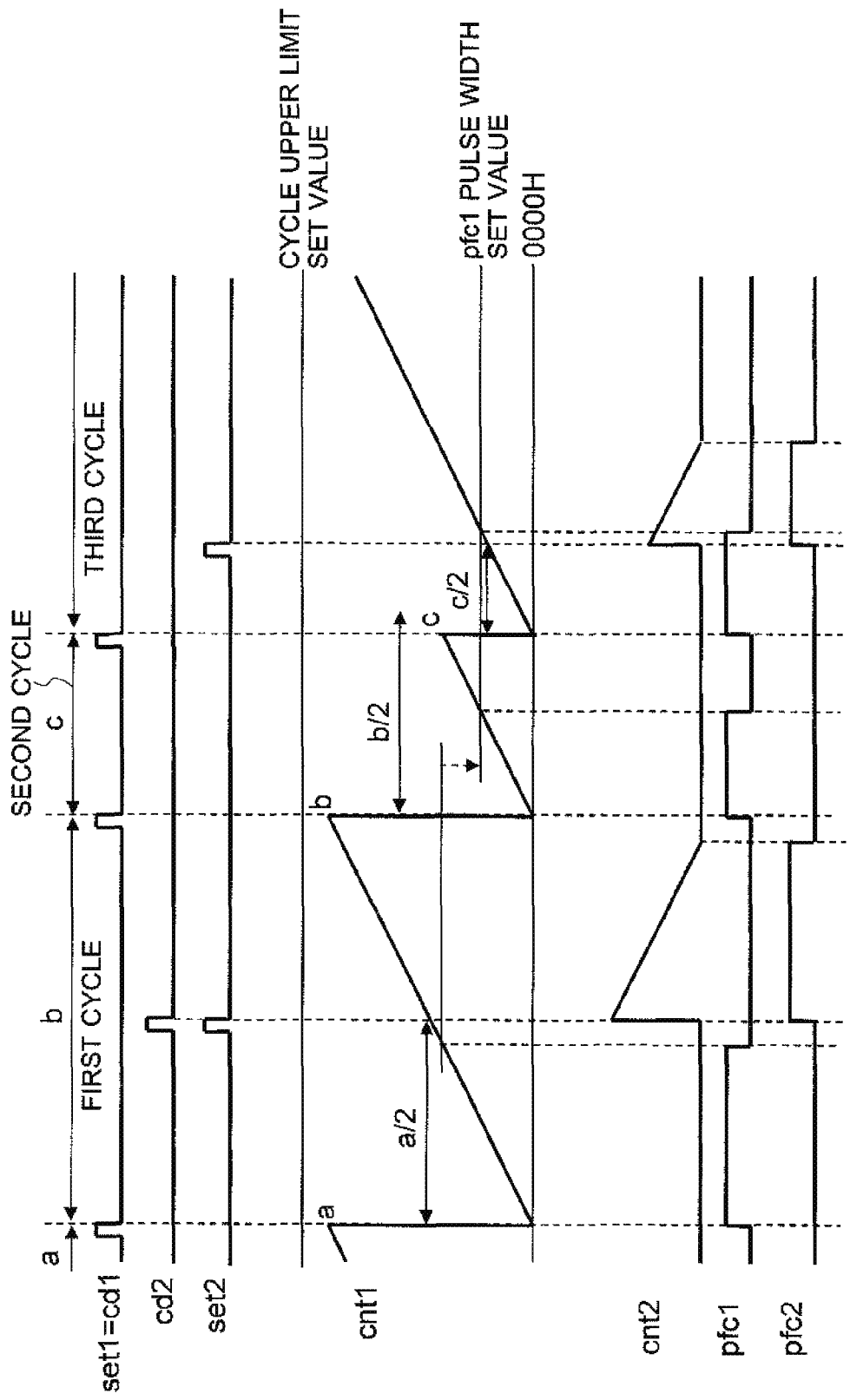
FIG. 15 is a timing diagram for explaining a method for generating the PFC control pulse signal pfc2.
Figure 16:
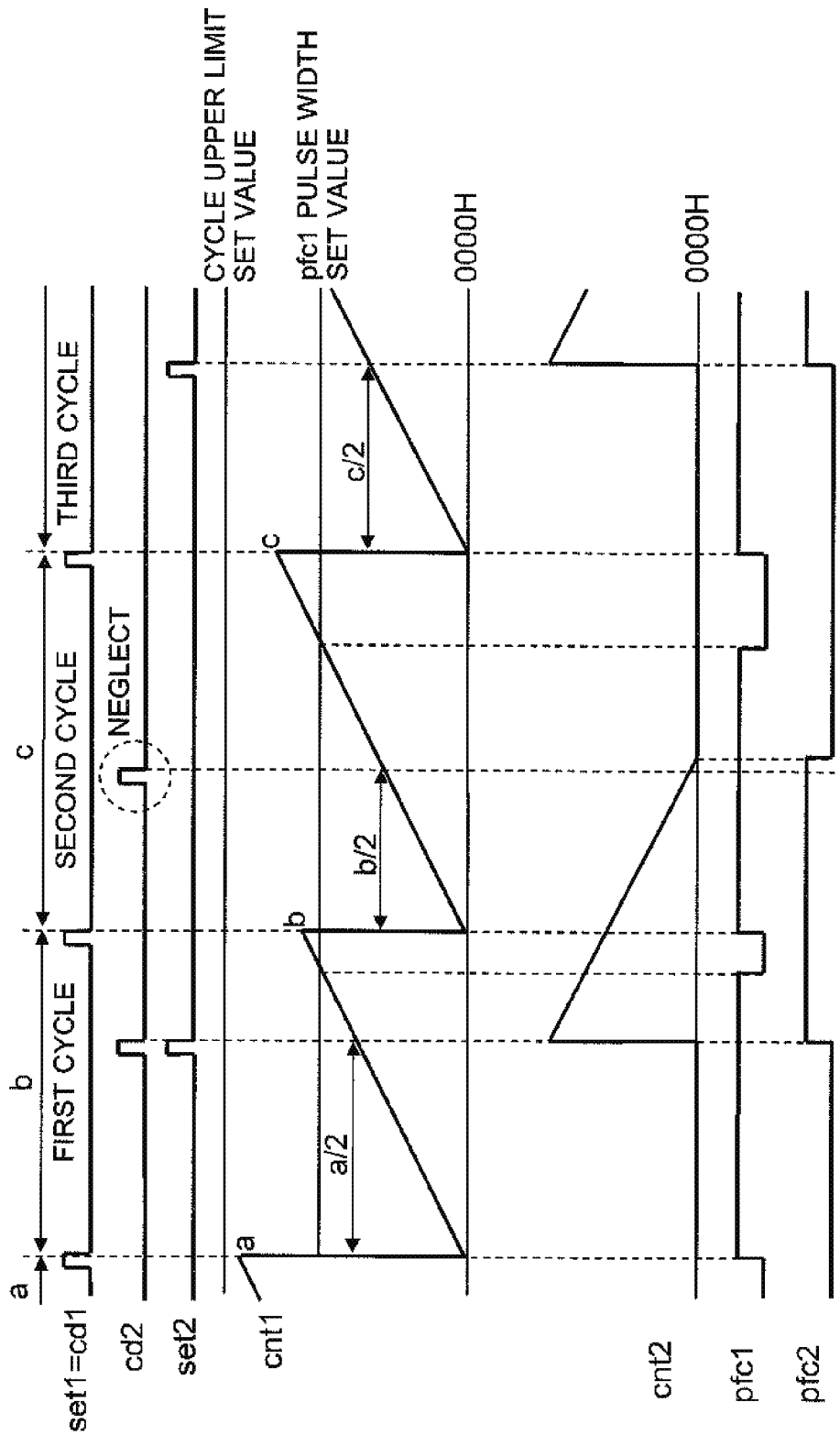
FIG. 16 is a timing diagram for explaining a method for generating the PFC control pulse signal pfc2.

Next, additional functions which can be included in the output timing correction circuit 113 will be described with reference to the timing diagrams of FIGS. 15 and 16. As with FIG. 8, FIGS. 15 and 16 are timing diagrams for explaining the method for generating the PFC control pulse signal pfc2. Each of FIGS. 15 and 16 shows, sequentially from the top, the set signal set1, the zero current detection signal cd2 of the current I2, the set signal set2, the count value cnt1 of the up-counter 101, the count value cnt2 of the down-counter 116, the reset signal rst2, the PFC control pulse signal pfc1, and the PFC control pulse signal pfc2.

First, FIG. 15 will be described. The first cycle is in the ideal state described above, so the description thereof is omitted. The second cycle indicates a special case in which a cycle "c" is shorter than the ½ cycle value T/2 of the preceding cycle=b/2. In this manner, when the cycle is shorter than the ½ cycle of the preceding cycle, the output timing correction circuit 113 may forcibly output the set signal set2 at the ½ cycle value T/2 of the subsequent cycle=c/2.

Next, FIG. 16 will be described. The first cycle is in the ideal state described above, so the description thereof is omitted. The second cycle indicates a special case in which the zero current detection signal cd2 of the current I2 is generated during the count-down of the down-counter 116 (that is, in the state where the PFC control pulse signal pfc2 is at the active level). In such a case, the zero current detection signal cd2 of the current I2 may be neglected.

Figure 17:
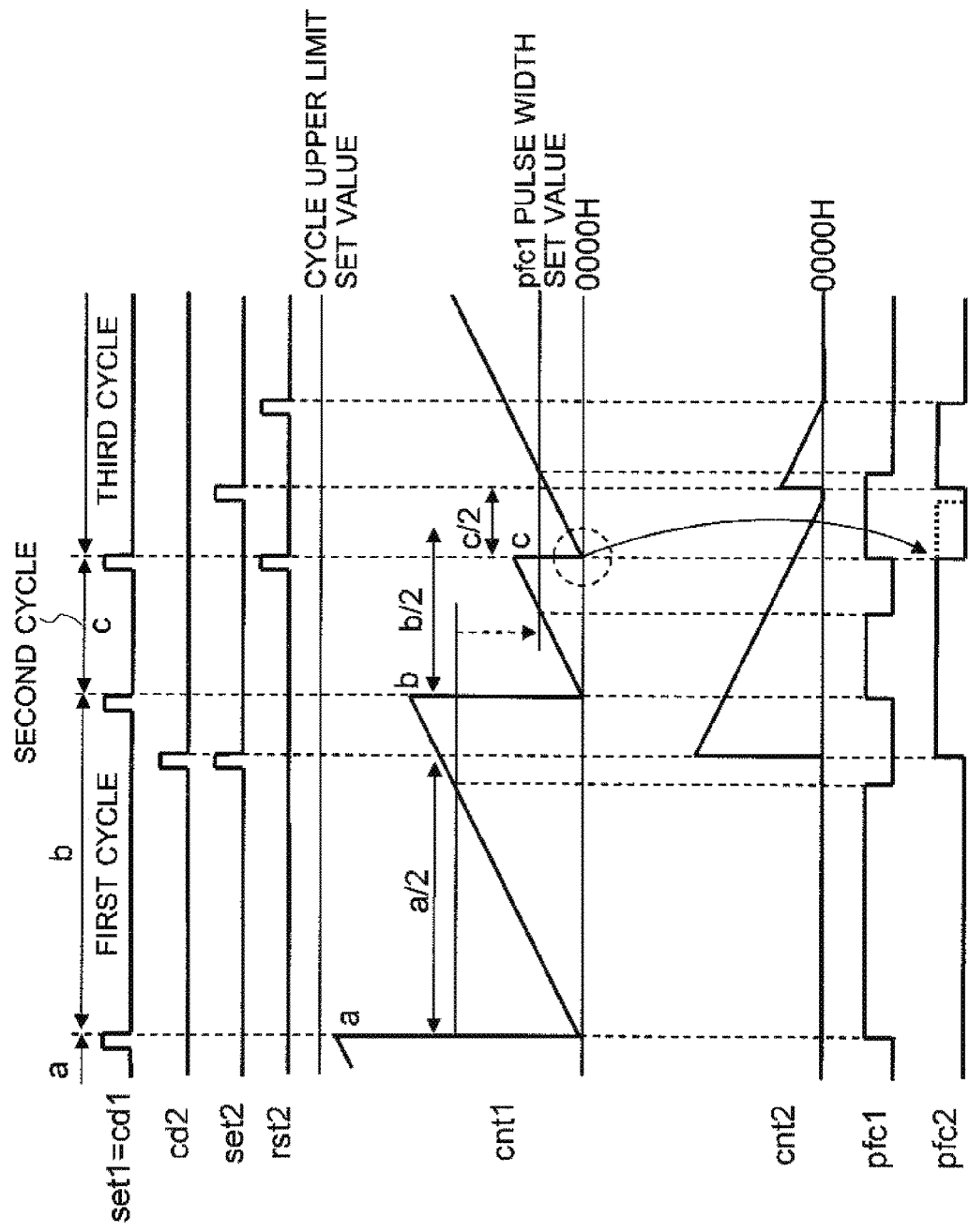
FIG. 17 is a timing diagram for explaining a method for generating the PFC control pulse signal pfc2.

Next, additional functions which can be included in the down-counter 116 will be described with reference to the timing diagram of FIG. 17. As with FIG. 8, FIG. 17 is a timing diagram for explaining the method for generating the PFC control pulse signal pfc2. FIG. 17 shows, sequentially from the top, the set signal set1, the zero current detection signal cd2 of the current I2, the set signal set2, the reset signal rst2, the count value cnt1 of the up-counter 101, the count value cnt2 of the down-counter 116, the PFC control pulse signal pfc1, and the PFC control pulse signal pfc2.

The example shown in FIG. 17 indicates a special case in which the PFC control pulse signal pfc2 switched to the active level at the ideal timing in the first cycle extends over the third cycle beyond the second cycle. In this manner, when the zero current detection signal cd1 of the current I1 is generated twice during the count-down of the down-counter 116 (that is, in the state where the PFC control pulse signal pfc2 is at the active level), the reset signal rst2 may be forcibly generated at the second time to switch the PFC control pulse signal pfc2 from the active level to the inactive level.

As described above, the PFC signal generation unit PSG according to this embodiment includes the output timing correction circuit 113. This output timing correction circuit 113 determines the timing at which the zero current detection signal cd2 of the current I2 is input, based on the set signal set1 for setting the PFC control pulse signal pfc1 to the active level and on the coincidence signal cs1 output from the phase comparator 112, and outputs the set signal set2 for setting the PFC control pulse signal pfc2 to the active level at an appropriate timing. This makes it possible to balance the high efficiency due to the detection of the zero current of the current I2 and the high efficiency achieved by setting the phase difference between the PFC control pulse signals pfc1 and pfc2 to be approximately equal to n, leading to a further improvement in the power factor correction by the PFC circuit.

Second Embodiment

Figure 18:
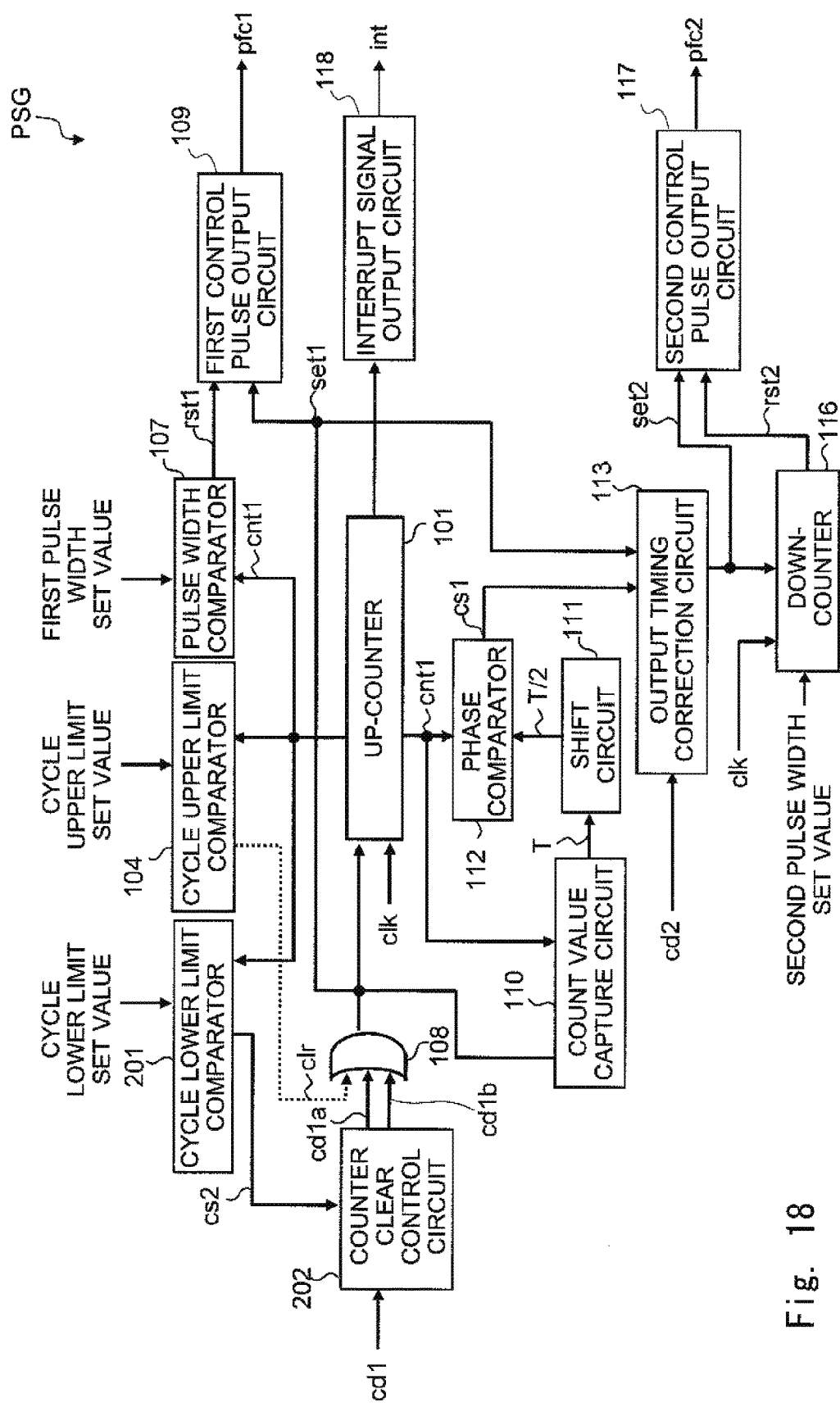
FIG. 18 is a block diagram of a PFC signal generation unit PSG according to a second embodiment.

Next, a PFC signal generation unit PSG according to a second embodiment will be described with reference to FIG. 18. FIG. 18 is a block diagram of the PFC signal generation unit PSG according to the second embodiment. The PFC signal generation unit PSG shown in FIG. 18 has a configuration in which a cycle lower limit comparator 201 and a counter clear control circuit 202 are added to the PFC signal generation unit PSG shown in FIG. 6. Note that in FIG. 18, the illustration of registers storing set values is omitted.

The cycle lower limit comparator 201 is a digital comparator, and is, more specifically, a coincidence circuit. When the count value cnt1 of the up-counter 101 matches the cycle lower limit set value, the cycle lower limit comparator 201 outputs a coincidence signal cs2. The coincidence signal cs2 is input to the counter clear control circuit 202.

The counter clear control circuit 202 determines the timing at which the zero current detection signal cd1 of the current I1 is input, based on the coincidence signal cs2 output from the cycle lower limit comparator 201, and outputs clear signals cd1a and cd1b at an appropriate timing. Specifically, when the zero current detection signal cd1 of the current I1 is input at a timing equal to or less than the cycle lower limit set value, the counter clear control circuit waits until the cycle lower limit set value is reached, and clears the count value of the up-counter 101. On the other hand, when the zero current detection signal cd1 of the current I1 is input at a timing beyond the cycle lower limit set value, the count value of the up-counter 101 is cleared at the timing, as usual. The configuration and operation of the counter clear control circuit 202 will be described in detail later.

The OR gate 108 receives the clear signals cd1a and cd1b output from the counter clear control circuit 202, and the clear signal clr output from the cycle upper limit comparator 104. The OR gate 108 outputs the set signal set1. That is, the set signal set1 is a clear signal for clearing the count value of the up-counter 101. The other components are similar to those shown in FIG. 6, so the description thereof is omitted.

Figure 19:
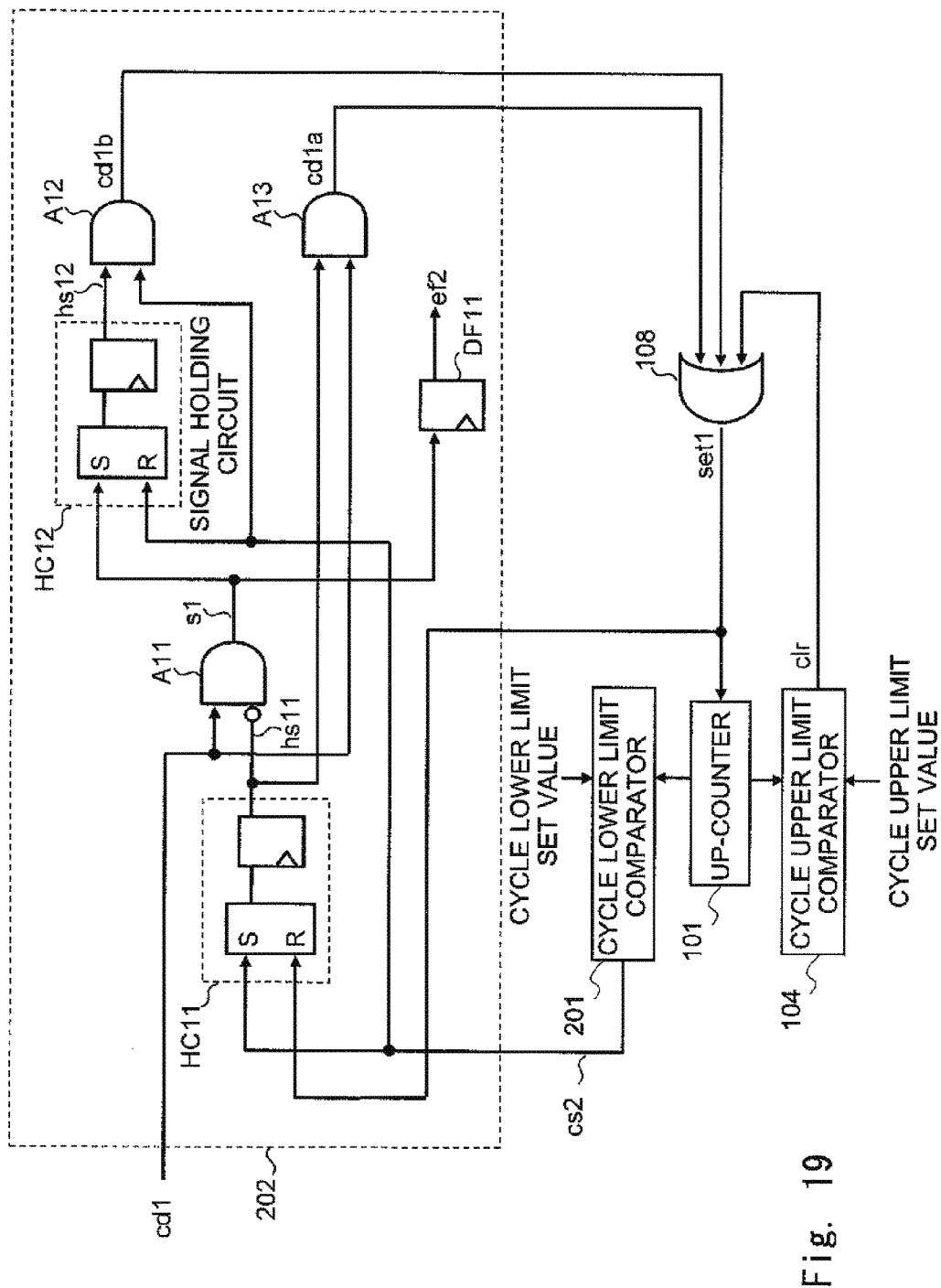
FIG. 19 is a circuit diagram showing an example of a specific circuit configuration of a counter clear control circuit 202.

Referring next to FIG. 19, a specific circuit configuration of the counter clear control circuit 202 will be described. The circuit configuration described below is by way of example only. FIG. 19 is a circuit diagram showing an example of a specific circuit configuration of the counter clear control circuit 202. As shown in FIG. 19, the counter clear control circuit 202 includes holding circuits HC11 and HC12, AND gates A11 to A13, and a D flip-flop DF11. Each of the holding circuits HC11 and HC12 is composed of a D flip-flop. In the preceding-stage, "S" and "R" respectively represent a set input and a reset input corresponding to a data input of each D flip-flop. The clock signal clk is input to a clock input of each D flip-flop.

The coincidence signal cs2 output from the cycle lower limit comparator 201 is input to the reset input R of the holding circuit HC11, and the set signal set1 is input to the reset input R. An output signal of the holding circuit HC1 is a period signal hs11 indicating a period exceeding the cycle lower limit set value. The inverted signal of the period signal hs11 is input to one input of the AND gate A11. The zero current detection signal cd1 of the current I1 is input to the other input of the AND gate A11.

An output signal of the AND gate A11 is a detection signal s1 to be generated when the zero current detection signal cd1 of the current I1 is input at a timing equal to or less than the cycle lower limit set value. This detection signal s1 is input to the set input S of the holding circuit HC12. The coincidence signal cs2 is input to the reset input R of the holding circuit HC12. An output signal of the holding circuit HC12 is a held signal hs12 to be held until the cycle lower limit set value is reached, when the zero current detection signal cd1 of the current I1 is input. This held signal hs12 is input to one input of the AND gate A12. The coincidence signal cs2 is input to the other input of the AND gate A12. An output signal of the AND gate A12 is the clear signal cd1b which constitutes one set signal set1.

The period signal hs11 output from the holding circuit HC11 is input to one input of the AND gate A13. The zero current detection signal cd1 of the current I1 is input to the other input of the AND gate A13. An output signal of the AND gate A13 is the clear signal cd1a which constitutes one set signal set1.

When the detection signal s1 is generated, the D flip-flop DF11 captures the detection signal s1 and outputs an error flag ef2.

Figure 20:
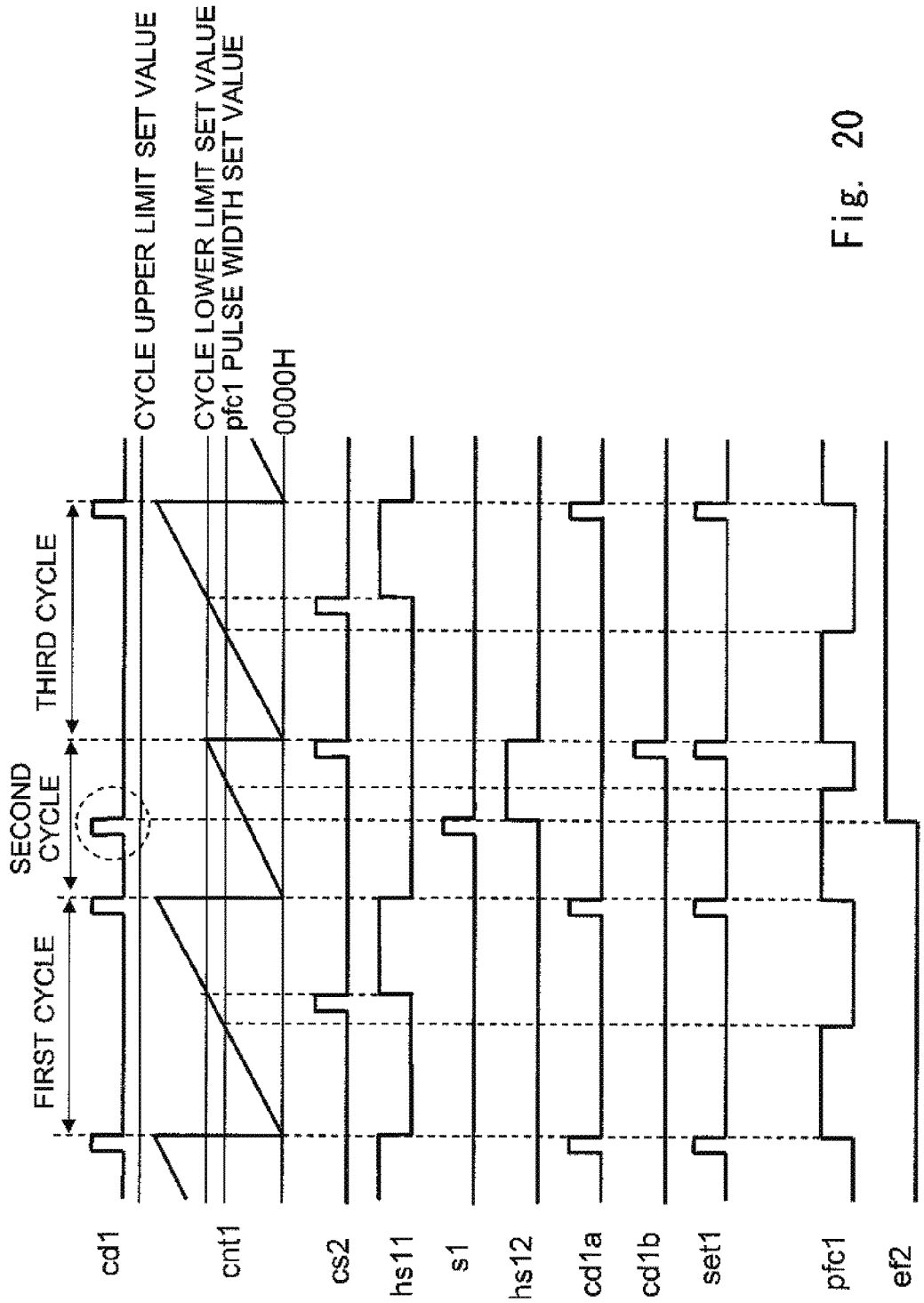
FIG. 20 is a timing diagram for explaining an operation of the counter clear control circuit 202.

Next, an operation of the counter clear control circuit 202 shown in FIG. 19 will be described with reference to the timing diagram of FIG. 20. FIG. 20 is a timing diagram for explaining an operation of the counter clear control circuit 202. FIG. 20 shows, sequentially from the top, the zero current detection signal cd1 of the current I1, the coincidence signal cs2, the period signal hs11, the set signal set1, the count value cnt1 of the up-counter 101, the coincidence signal cs2, the detection signal s1, the held signal hs12, the clear signal cd1a, the clear signal cd1b, the set signal set1, the PFC control pulse signal pfc1, and the error flag ef2.

In the first and third cycles shown in FIG. 20, the zero current detection signal cd1 of the current I1 is input at a timing after the cycle lower limit set value is reached. Accordingly, the clear signal cd1a is output at the timing, as usual.

On the other hand, in the second cycle shown in FIG. 20, the zero current detection signal cd1 of the current I1 is input at a timing equal to or less than the cycle lower limit set value. Accordingly, the zero current detection signal cd1 of the current I1 is input, while the period signal hs11 indicating a period exceeding the cycle lower limit set value is held at L. At the timing, the detection signal s1 is generated, and the held signal hs12 shifts from L to H and is held. Then, at the timing when the coincidence signal cs2 indicating the lapse of the cycle lower limit set value is input, the held signal hs12 shifts from H to L, and the clear signal cd1b is output. In this manner, the cycle lower limit set value is set and the cycle lower limit of the PFC control pulse signal pfc1 is ensured, thereby making it possible to generate the PFC control pulse signal that further improves the power factor correction by the PFC circuit.

While the present invention has been described above with reference to embodiments, the present invention is not limited by the above embodiments. The configuration and details of the prevent invention can be modified in various manners which can be understood by those skilled in the art within the scope of the invention.

This application is based upon and claims the benefit of priority from Japanese patent application No. 2011-098789 filed on Apr. 26, 2011, the disclosure of which is incorporated herein in its entirety by reference.

REFERENCE SIGNS LIST

1 FIRST CIRCUIT
2 SECOND CIRCUIT
3 THIRD CIRCUIT
11 ALLOWABLE PERIOD DOWN-COUNTER
101 UP-COUNTER
102 CYCLE UPPER LIMIT SETTING REGISTER
103 CYCLE UPPER LIMIT CAPTURE REGISTER
104 CYCLE UPPER LIMIT COMPARATOR

105 FIRST PULSE WIDTH SETTING REGISTER
106 FIRST PULSE WIDTH CAPTURE REGISTER
107 PULSE WIDTH COMPARATOR
108 OR GATE
109 FIRST CONTROL PULSE OUTPUT CIRCUIT
110 COUNT VALUE CAPTURE CIRCUIT
111 SHIFT CIRCUIT
112 PHASE COMPARATOR
113 OUTPUT TIMING CORRECTION CIRCUIT
114 SECOND PULSE WIDTH SETTING REGISTER
115 SECOND PULSE WIDTH CAPTURE REGISTER
116 DOWN-COUNTER
117 SECOND CONTROL PULSE OUTPUT CIRCUIT
118 INTERRUPT SIGNAL OUTPUT CIRCUIT
201 CYCLE LOWER LIMIT COMPARATOR
202 COUNTER CLEAR CONTROL CIRCUIT
A1-A5, A11-A13 AND GATE
AP AC POWER SUPPLY
C1, C2 SMOOTHING CAPACITOR
cd1, cd2 ZERO CURRENT DETECTION SIGNAL
c1r, cd1a, cd1b CLEAR SIGNAL
CG CLOCK GENERATION UNIT
clk CLOCK SIGNAL
cnt1, cnt2, cnt3 COUNT VALUE
cs1, cs2 COINCIDENCE SIGNAL
D1-D3 DIODE
DF1, DF11 D FLIP-FLOP
ef1, ef2 ERROR FLAG
fin COUNT END SIGNAL
FWR FULL-WAVE RECTIFICATION CIRCUIT
HC1-HC4, HC11, HC12 HOLDING CIRCUIT
hs1, hs11 PERIOD SIGNAL
hs2, hs4, hs12 HELD SIGNAL
hs3 DETERMINATION PERIOD SIGNAL
int INTERRUPT SIGNAL
IOU UNIT
L1, L11, L12, L2, L21, L22, L3 INDUCTOR LED LED
Lm1, Lm2 MONITOR INDUCTOR
MCU PROCESSOR SYSTEM
MEM MEMORY
MON MONITOR UNIT
mon, mon1-mon4 FEEDBACK SIGNAL
NM1-NM3 NMOS TRANSISTOR
O1, O2 OR GATE
PE OPERATION CORE
PERI PERIPHERAL CIRCUIT
pfc, pfc1, pfc2 PFC CONTROL PULSE SIGNAL
PSG PFC SIGNAL GENERATION UNIT
PWM PWM SIGNAL GENERATION UNIT
pwm PWM CONTROL PULSE SIGNAL
PWR POWER SUPPLY CIRCUIT (CONTROL TARGET CIRCUIT)
R, R1, R2, Rm, Rm1, Rm2 RESISTOR

The invention claimed is:

1. A microcontroller comprising:
a first terminal which outputs a first control signal for controlling a first switch connected to a first inductor;
a second terminal which outputs a second control signal for controlling a second switch connected to a second inductor;
a monitor circuit that receives a first feedback signal corresponding to a current flowing through the first inductor and a second feedback signal corresponding to a current flowing through the second inductor;
a first control signal output circuit that outputs the first control signal to control the first switch;
a timing adjustment circuit that generates a third control signal to control the second switch; and
a second control signal output circuit that generates the second control signal to control the second switch, according to the third control signal,
wherein the first control signal controls the first switch to turn on when the monitor circuit detects a zero current detection timing of the first inductor;
wherein the second control signal controls the second switch to turn on at a target timing in a first cycle when the monitor circuit detects a zero current detection timing of the second inductor before the target timing;
wherein the second control signal controls the second switch to turn on at the zero current detection timing in the first cycle when the monitor circuit detects the zero current detection timing of the second inductor within an allowable period from the target timing in the first cycle; and
wherein the second control signal controls the second switch to turn on at the target timing in a second cycle subsequent to the first cycle when the monitor circuit detects the zero current detection timing of the second inductor in the first cycle after the allowable period from the target timing in the first cycle.

2. The microcontroller according to claim 1, further comprising a first counter having a count value cleared at the zero current detection timing of the first inductor.

3. The microcontroller according to claim 2, further comprising a counter clear control circuit that clears the count value after waiting until a cycle lower limit is reached, when the zero current detection timing of the first inductor is below the cycle lower limit.

4. The microcontroller according to claim 2, further comprising a capture circuit that acquires a maximum count value of the first counter in a preceding cycle,
wherein the target timing is determined based on the maximum count value.

5. The microcontroller according to claim 4, further comprising:
a shift circuit that generates a set value of the target timing from the maximum count value; and
a first digital comparator that compares the set value of the target timing with the count value of the first counter, and generates the target timing.

6. The microcontroller according to claim 4, wherein the target timing is in a range from $3/8$ to $5/8$ of the maximum count value.

7. The microcontroller according to claim 4, wherein the allowable period is in a range from $1/64$ to $1/8$ of the maximum count value.

8. The microcontroller according to claim 2, further comprising a second counter that counts down a set value of a pulse width of the second control signal determined based on a third feedback signal from a PFC circuit.

9. The microcontroller according to claim 8, further comprising a second digital comparator that compares the count value of the first counter with a set value of a pulse width of the first control signal determined based on the third feedback signal.

10. The microcontroller according to claim 1, wherein the second control signal controls the second switch to turn on at the target timing after waiting until the second cycle subsequent to the first cycle when the monitor circuit detects the zero current detection timing of the second inductor in the first cycle after the allowable period from the target timing in the first cycle.

* * * * *